United States Patent [19]

Watanabe et al.

[11] Patent Number: 5,109,365
[45] Date of Patent: Apr. 28, 1992

[54] RECORD INFORMATION REPRODUCING METHOD WITH CONTENT IDENTIFIERS

[75] Inventors: Yoshihiko Watanabe; Tsuneyoshi Nagashita; Susumu Niinuma; Isamu Nomura; Kimito Kobayashi; Hiroyuki Abe; Takayuki Iijima; Kazuto Shimokawa; Akira Haeno; Yoshio Aoyagi; Toshiyuki Kimura; Akio Namiki; Isao Matsumoto, all of Saitama, Japan

[73] Assignee: Pioneer Electronic Corporation, Tokyo, Japan

[21] Appl. No.: 882,063

[22] Filed: Jul. 3, 1986

[30] Foreign Application Priority Data

Jul. 3, 1985 [JP] Japan ................................ 60-147468
Jul. 3, 1985 [JP] Japan ................................ 60-147469
Jul. 3, 1985 [JP] Japan ................................ 60-147470

[51] Int. Cl.$^5$ ............................................. G11B 17/22
[52] U.S. Cl. ......................................... 369/32; 369/30; 369/34
[58] Field of Search ................... 369/32, 43, 44, 77.2, 369/215, 50, 111, 69, 219, 54, 275, 30; 358/342

[56] References Cited

U.S. PATENT DOCUMENTS 4,507,771  3/1985  Tanaka .
4,667,314  5/1987  Iwashima ............................. 360/69
4,675,855  6/1987  Iso et al. .
4,701,898  10/1987  Griddings .

Primary Examiner—William M. Shoop, Jr.
Assistant Examiner—Brian K. Young
Attorney, Agent, or Firm—Sughrue, Mion, Zinn, Macpeak & Seas

[57] ABSTRACT

A method of operating a disk player that reproduces information recorded on a disk. Programs on the disk are addressed from a directory in a memory and the programs are sequentially accessed according to the order in the directory. The directory can be filled by inserting random numbers or by scanning through the programs or over the tracks. A table of contents at the beginning of the disk is read if possible. The tracks can be scanned and only tracks having new programs are reproduced. Also a playback position servo operates with a dead-zone in the drive voltage.

11 Claims, 24 Drawing Sheets

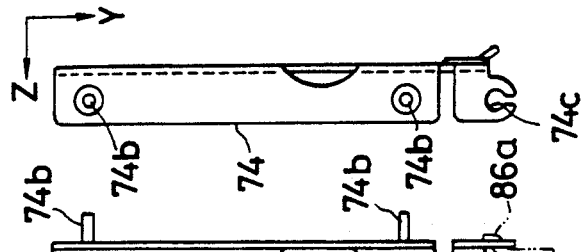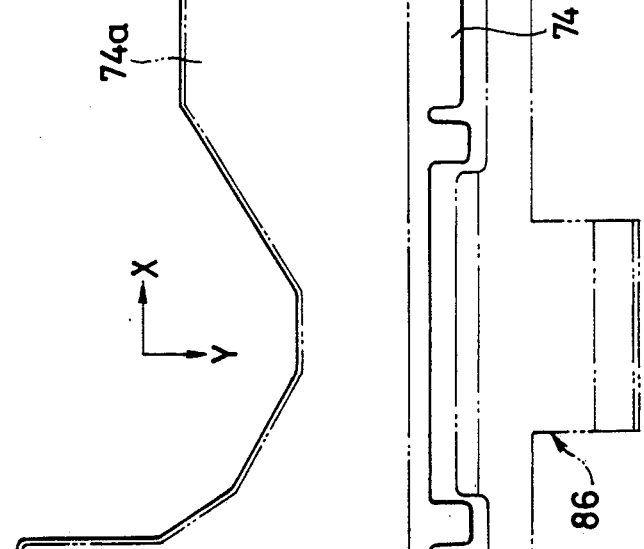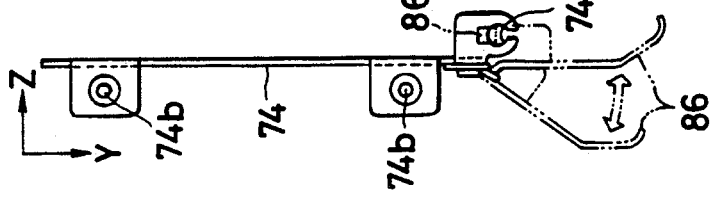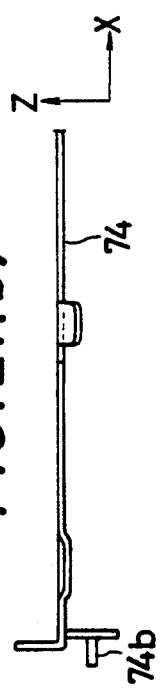

RECORD INFORMATION REPRODUCING METHOD WITH CONTENT IDENTIFIERS

BACKGROUND OF THE INVENTION

1. Field of the Invention

The present invention relates to a reproducing method for recorded information and, more particularly to a reproducing method for recorded information by which each of a plurality of pieces of program information recorded in a recording medium is allocated in advance to have its address information stored in a memory so that the pieces of program information may be reproduced in the order of storage in response to the operation of a memory play key.

2. Background Art

There is known a method for reproducing a recording medium, which is recorded with a plurality of pieces of program information, such as a digital audio disk. According to the known method, arbitrary program information is allocated in advance to have its address information stored in a memory so that the pieces of program information are reproduced in the order of storage.

In this reproducing method, according to the prior art, the reproduction is not started from other than the program information corresponding to the address information stored first in the memory, when that memory play mode is selected. As a result, the same program information is started every time the memory play mode is selected so that reproduction of the very same program information is always repeated.

SUMMARY OF THE INVENTION

The present invention has been conceived in view of the point described above and has an object to provide a recorded information reproducing method in which program information to be first reproduced can be changed sequentially each time a memory play mode is selected.

In the recorded image reproducing method according to the present invention, the order of address information to be called from a memory is stored in a memory play mode so that, in case the memory play mode is released and selected again, a reproduction is started from the program information which corresponds to the address information next to the last called address information in the preceding memory play mode.

BRIEF DESCRIPTION OF THE DRAWINGS

FIGS. 5-12, 13a, 13b, 14a, 14b, 15a, 15b, 16a-16d, 17a, 17b, 18a-18c, 19a, 19b, 20a-20c, and 21a-21d are detailed views showing portions of said internal structure.

DETAILED DESCRIPTION OF THE PREFERRED EMBODIMENTS

The present invention will now be described in connection with an auto-loading disk player with reference to the accompanying drawings.

Figure 1:
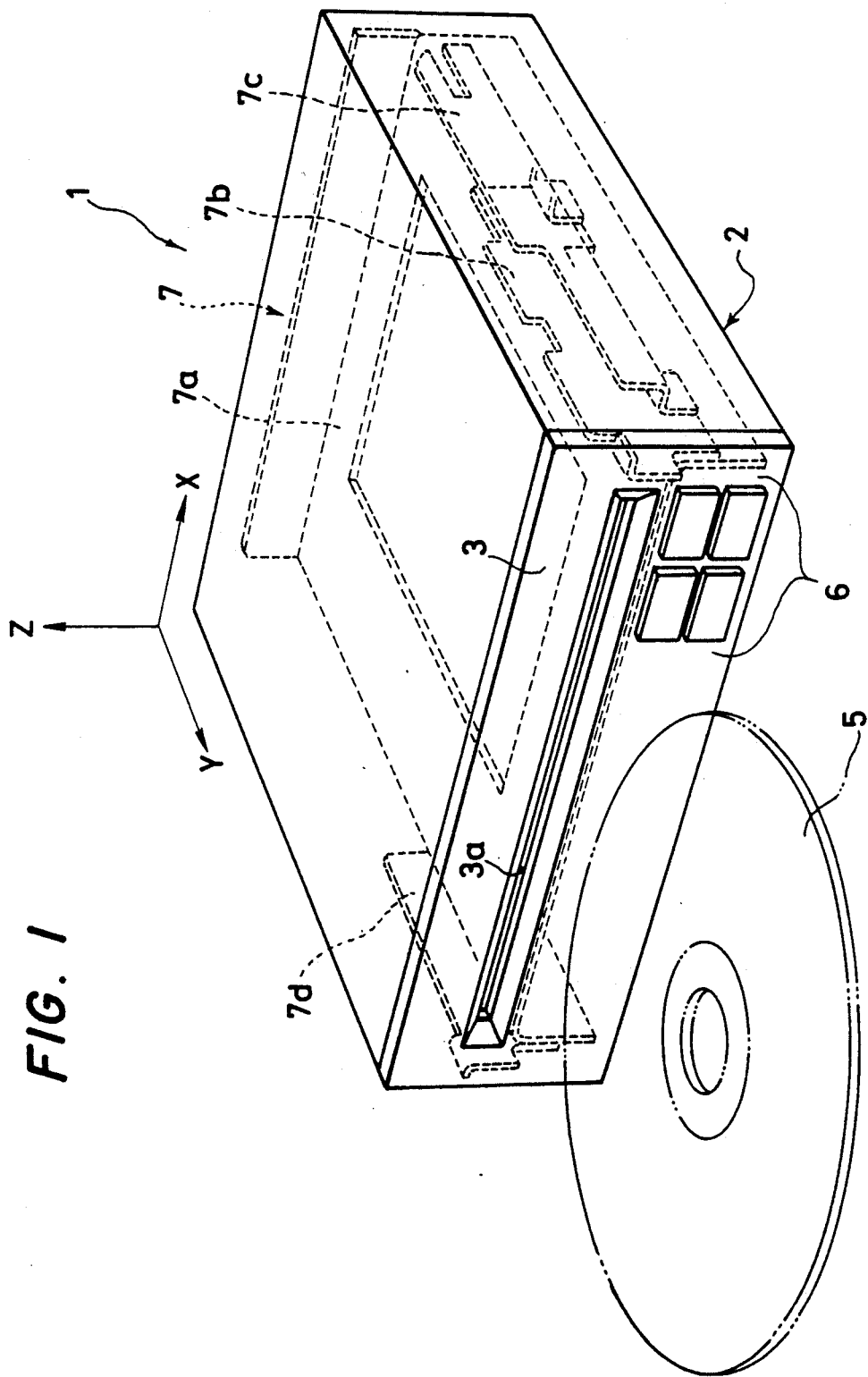
FIG. 1 is a schematic perspective view showing the whole construction of the auto loading disk player.

In the drawings, reference numeral 1 generally designates the entire structure of the auto loading disk player to be described. As shown in FIG. 1, a front panel 3 forming part of a housing 2 is formed with a slot 3a which extends to the right and left for inserting therethrough a disk 5 to be played. Here, arrow X denotes the rightward direction whereas arrow Y denotes the forward direction. On the other hand, arrow Z denotes the upward direction. Incidentally, the disk 5 is of the type in which the disk player 1 records and reads out signals with the use of a laser beam. The disk 5 has an external diameter of about 12 cm. On the front panel 3, on the other hand, there is arranged a group of control buttons 6 for performing the operations of the disk player such as play start or disk eject.

As shown in FIGS. 1 to 4, a chassis 7 is disposed in the housing 2. This chassis 7 is constructed of a body 7a, two sub-chassis B 7b and C 7c which are juxtaposed to each other at the righthand end portions of the body 7a, and a sub-chassis D 7d which is disposed at the lefthand end front portion of the body 7a. These respective sub-chassis 7b, 7c and 7d are shown in detail in FIGS. 13(a) to FIG. 15(b). Above the chassis 7, there is disposed a tray 10 (shown alone in FIG. 16(a)-16(d) and positioned in FIGS. 2-4) which is made freely movable in parallel with the disk carrying surface of a turntable, to be described later, i.e., in the forward and backward directions, in the direction of the arrow Y and in the opposite direction. As is apparent especially from FIGS. 16(a) to 16(d), the tray 10 is constructed of a body 10a, which extends to the right and left (i.e., in the direction of the arrow X and in the opposite direction), and a pair of right and left side portions 10b and 10c which are integrated with both the right and left end portions of the body 10a and extend forward (i.e., in the direction of the arrow Y). The right side portion 10b of therefrom such that the pin 10d is slidably engaged with a slot 7f formed in the sub-chassis C 7c and extending forward and backward.

Figure 2:
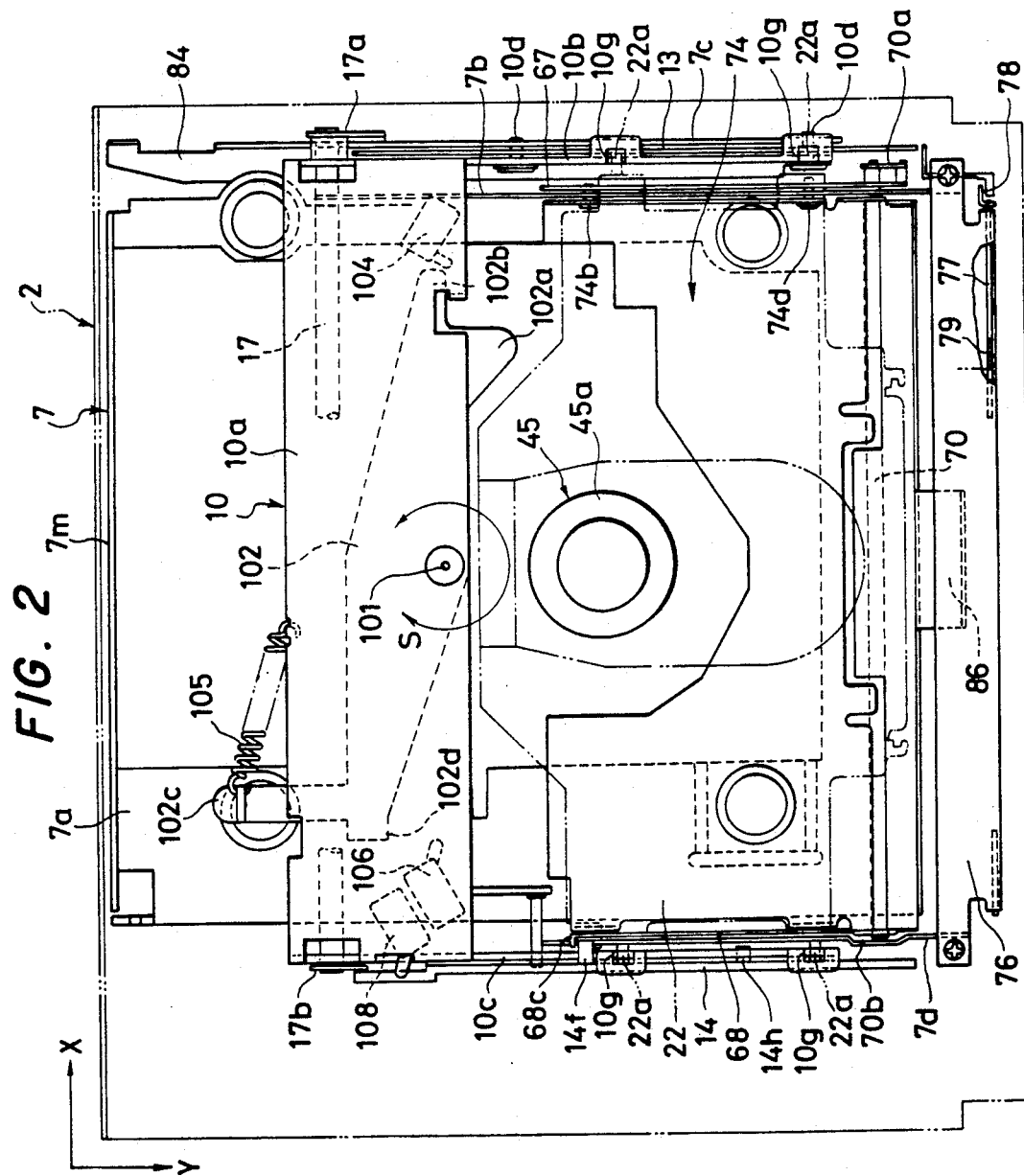
FIGS. 2 to 4 are a top plan view, a lefthand side elevation and a righthand side elevation showing the internal structure of said auto loading disk player, respectively.

At both the right and left sides of the chassis 7, on the other hand, there are arranged, as shown in FIG. 2, a pair of moving members 13 and 14. These moving members 13 and 14 are shown in detail in FIGS. 17(a) and 17(b) and FIGS. 18(a) and 18(b). The lefthand moving member 14 is made of a resin and is carried, as shown in FIG. 4, on the left side portion 10c of the tray 10, which is slidably supported by a guide shaft 15 extending from and fixed to the left end portion of the body 7a of the chassis 7 in the moving directions of the tray 10, i.e., in the forward and backward directions in the direction of the arrow Y and in the opposite direction. More specifically, the moving member 14 is supported by a slot 14a formed therein to extend in the forward and backward directions such that the slot 14a is slidably engaged with a pin 10f anchored to project from the aforementioned left side portion 10c. On the other hand, the lefthand moving member 13 is made of a steel plate and is carried, as is apparent from FIG. 3, such that a slot 13a formed therein to extend in the forward and backward directions is slidably engaged with the pin 10d formed to project from the aforementioned right side portion 10b.

At a rear end portion of the tray 10, a coacting shaft 17 extends to the right and left (shown best in FIG. 2) which has arms 17a and 17b (shown in FIGS. 3 and 4) fixed to both the ends thereof and which is rotatably borne in the tray 10. From the respective leading end portions of the arms 17a and 17b, there are formed projecting pins 17c and 17d which are slidably engaged with slots 13b and 14b formed to extend from the respective rear end portions of the moving members 13 and 14 in the vertical directions (i.e., in the direction of the arrow Z and in the opposite direction). In the lefthand end lower portion of the chassis 7, as shown in FIG. 4, there is rotatably borne a worm shaft 19 which extends in the moving directions of the moving member 14, i.e., in the forward and backward directions in the direction of the arrow Y and in the opposite direction. A motor 20 is fixed in the lefthand rear end portion of the chassis 7 such that a worm gear 20a fitted on the output shaft of the motor 20 meshes with a worm wheel 19a fitted on the shaft 19a is formed at its front end portion with a worm gear 19b which is engaged with a rack 14c formed at the lower end portion of the moving member 14 in the moving directions of that member 14, i.e., in the forward and backward directions.

The coacting shaft 17 including the arms 17a and 17b, the worm shaft 19 including the worm wheel 19a and worm 19b, and the motor 20 including the worm 20a, as described above, together constitute drive force applying means for applying driving force to the moving members 13 and 14.

Between the right and left side portions 10b and 10c of the tray 10, and thus between the two moving members 13 and 14, as shown in FIG. 2, there is arranged a container 22 for carrying the disk 5. The container 22 is shown in detail in FIG. 5. This container 22, the tray 10 and the moving members 13 and 14 together constitute a disk carrying unit. On each of the right and left end portions of the container 22, there are formed one pair of a total of four pins 22a which extend to the right and left. The container 22 is movably carried on the tray 10 within a predetermined range in directions perpendicular to the tray moving directions, i.e., in the vertical directions As a result, those respective pins 22a are slidably engaged with four slots 10g so formed in the right and left side portion 10b and 10c of the tray 10 so as to extend in the vertical direction, i.e., in the direction of the arrow Z. The four pins 22a thus formed to project from the container 22 are also slidably engaged through the aforementioned slots 10g with two cam slots 13d and two cam slots 14d which are formed respectively in the moving members 13 and 14. The cam slots 13d and 14d each include a slanting portion between two horizontal portions. The slanting portion slants in the inserting direction of the disk from the disk inserting slot 3a, i.e., upward from the front to the back of the disk player 1. In other words, in the direction in which the container 2 leaves the disk carrying surface of the later-described turn table. The two horizontal portions extend forward and backward, respectively, from the front and back ends of the slanting portions. In other words, the container 22 is moved upward and downward in accordance with the forward and backward movements of the moving members 13 and 14 because of the engagement of the pins 22a of the container 22 with the slanting cam slots 13d and 14d.

Incidentally, there is provided locking and releasing means, although not shown, for locking the container 22 with respect to the tray 10 until the tray 10 reaches an aligned position just above the later-described turntable. This aligned position is the position in which the center of rotation of the disk 5 carried on the container 22 is substantially aligned with the turning axis of the turnable. The locking and releasing means also release the locked state of the container 22 on the tray 10 when the tray 10 reaches the aforementioned aligned position above the turntable and at that point locks the tray 10 with respect to the chassis 7.

Next, the description to be made in the following is directed to disk gripping means which are mounted on the aforementioned container 22 for gripping the disk 5 inserted from the slot 3a and for positioning the disk 5 is a predetermined position on the container 22.

Figure 5:
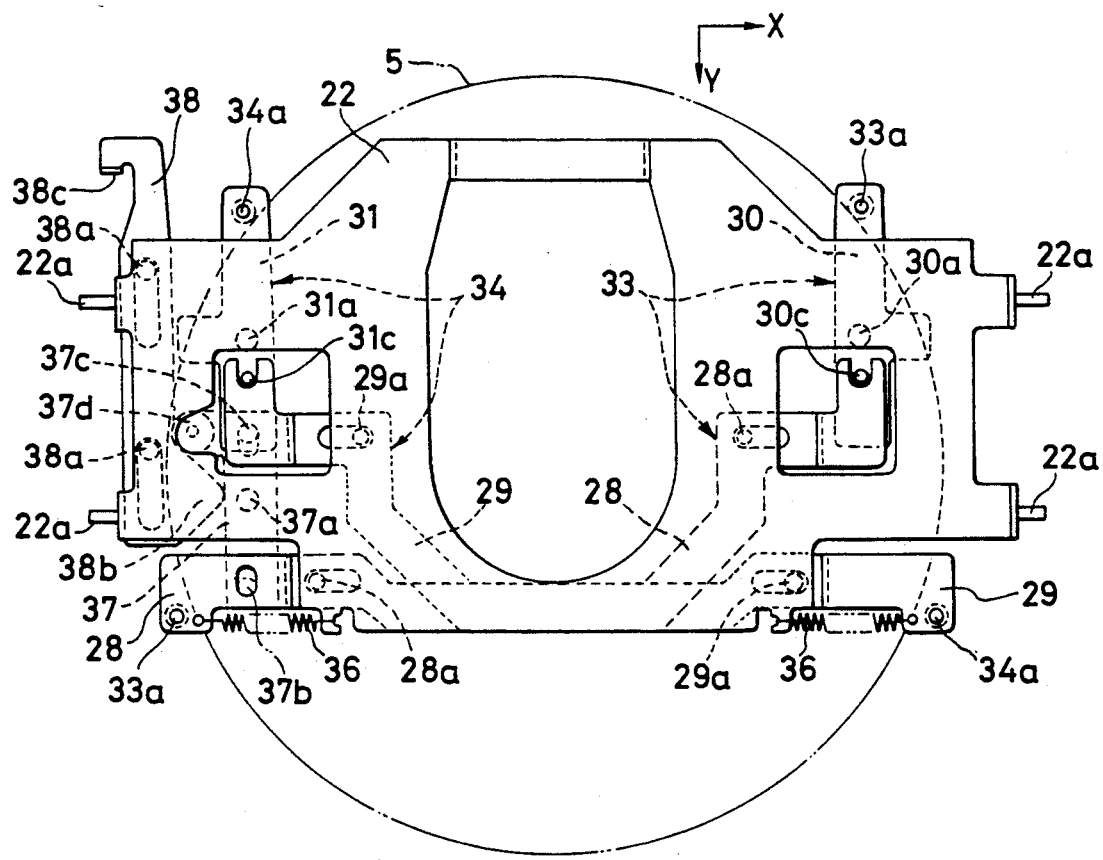

On the lower surface of the container 22, as is apparent from FIG. 5, there are arranged a pair of right and left long plates 28 and 29 which are loosely attached to the container 22 through two respective pins 28a and 29a. The loose attachment is such that the long plates 28 and 29 can move to the right and left with respect to the container, i.e., in the direction of the arrow X and in the opposite direction, respectively. At the back of the long plates 28 and 29, there are arranged a pair of right and left short plates 30 and 31 which are pivoted to the container 22 through pins 30a and 31a. Each of the turning end portions of the short plates 30 and 31, i.e., each of the end portions facing the front of the disk player 1, is hinged to respective end portions of the long plates 28 and 29 through pivot pins 30c and 31c.

The long plate 28 and the short plate 30 will be generally called a first gripping member 33, whereas the long plate 29 and the short plate 31 will be generally called a second gripping member 34. In other words, these paired gripping members 33 and 34 are arranged at the two sides of the passage into which the disk is inserted and are made movable relative to each other in a plane generally in parallel with the principal surface of the container 22, i.e., in parallel with the disk carrying surface of the later-described turntable. From predetermined positions on the lower surface at the front and back of the respective gripping member 33 and 34, two pins 33a and two pins 34a extend downward, i.e., in the direction opposite to the direction of the arrow Z. These pins 33a and 34a extend perpendicularly to the principal surface of the container 22 and act as engagement pins for engaging the outer circumference of the inserted disk 5. Here, a pair of coil springs 36 are provided for biasing the two gripping members 33 and 34 in the directions so that all four pins 33a and 34a approach the outer disk circumference.

Figure 6:
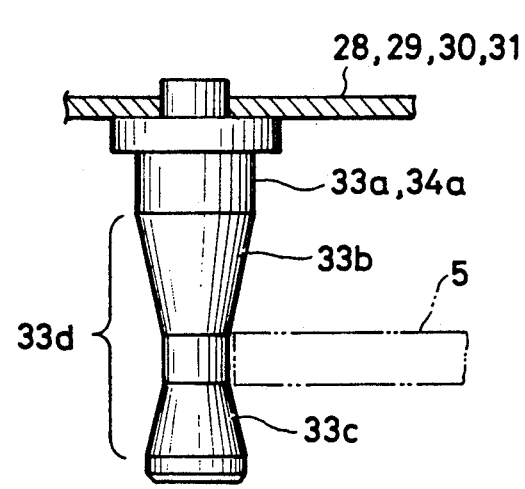

As shown in FIG. 6, each pin 33a or 34a is formed with a centrally tapered portion 33d which in turn is formed of a first taper portion 33b tapered inward toward the disk carrying surface of the turnable, i.e., downward in the direction opposite to that of the arrow Z. A second taper portion 33c diverges outward in the downward in the direction from first taper portion 33b and is made engageable with the outer disk circumference.

As shown in FIG. 5, the container 22 is further formed with a synchronizing plate 37 for synchronously driving the first and second gripping members 33 and 34. More specifically, the synchronizing plate 37 has its central portion rotatably attached to the container 22 through a shaft pin 37a and its front and rear end portions loosely hinged to the first and second gripping members 33 and 34 through pins 37b and 37c. The synchronizing plate 37 is equipped at its rear end portion with a roller 37d, which abuts against a triangular cam surface 38b of an intermediate lever 38. The intermediate lever 38 is disposed at the left side of the container as to reciprocally move in the forward and backward directions, i.e., in the direction of the arrow Y and in the opposite direction. This movement of the intermediate lever 38 is guided by a pair of pins 38a. When that intermediate lever 38 moves toward the back of the disk player 1, the synchronizing plate 37 turns in the clockwise direction so that the first and second gripping members 33 and 34 are driven in the directions to release the gripping of the disk 5 by the pins 33a and 34a. Incidentally, the intermediate lever 38 is moved backward in accordance with the backward movement of the aforementioned moving lever 14. As a result, a projection 14f (FIG. 2) projecting from the moving member 14 comes into engagement with a rear end bent portion 38c of the intermediate lever 38. The forward return of the intermediate lever 38 is effected by the previously mentioned coil springs 36 between the long plates 28 and 29 and the container 22.

The first and second gripping members 33 and 34, the coil springs 36 acting as the biasing means, and the synchronizing plate 37, as described above, together constitute disk gripping means for gripping the disk 5 inserted from the slot 3a and for positioning the same in a predetermined position on the container 22. Incidentally, the disk gripping means is incorporated into the aforementioned disk carrying portion (which is composed of the tray 10, the moving members 13 and 14 and the container 22). Moreover, the disk carrying unit, the chassis 7 movably carrying the disk carrying unit, the drive force applying means including the motor 20 and so on for applying the drive force to the moving members 13 and 14, and peripheral auxiliary members associated with the other components together constitute a disk conveying mechanism for conveying the disk 5 to the disk carrying surface of the turn table.

Next, play means for performing the disk play will be described in the following.

Figure 7:
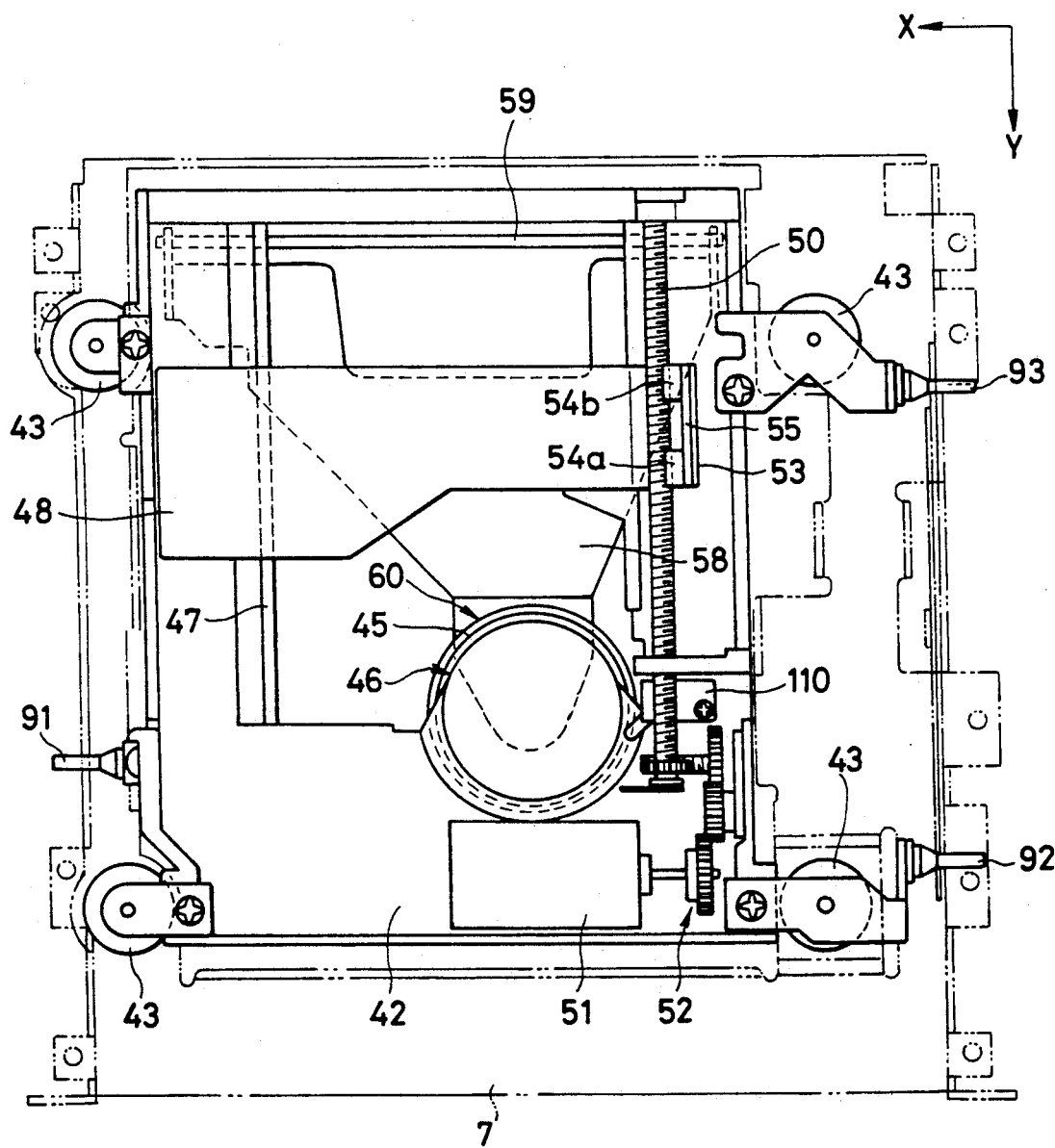
Figure 8:
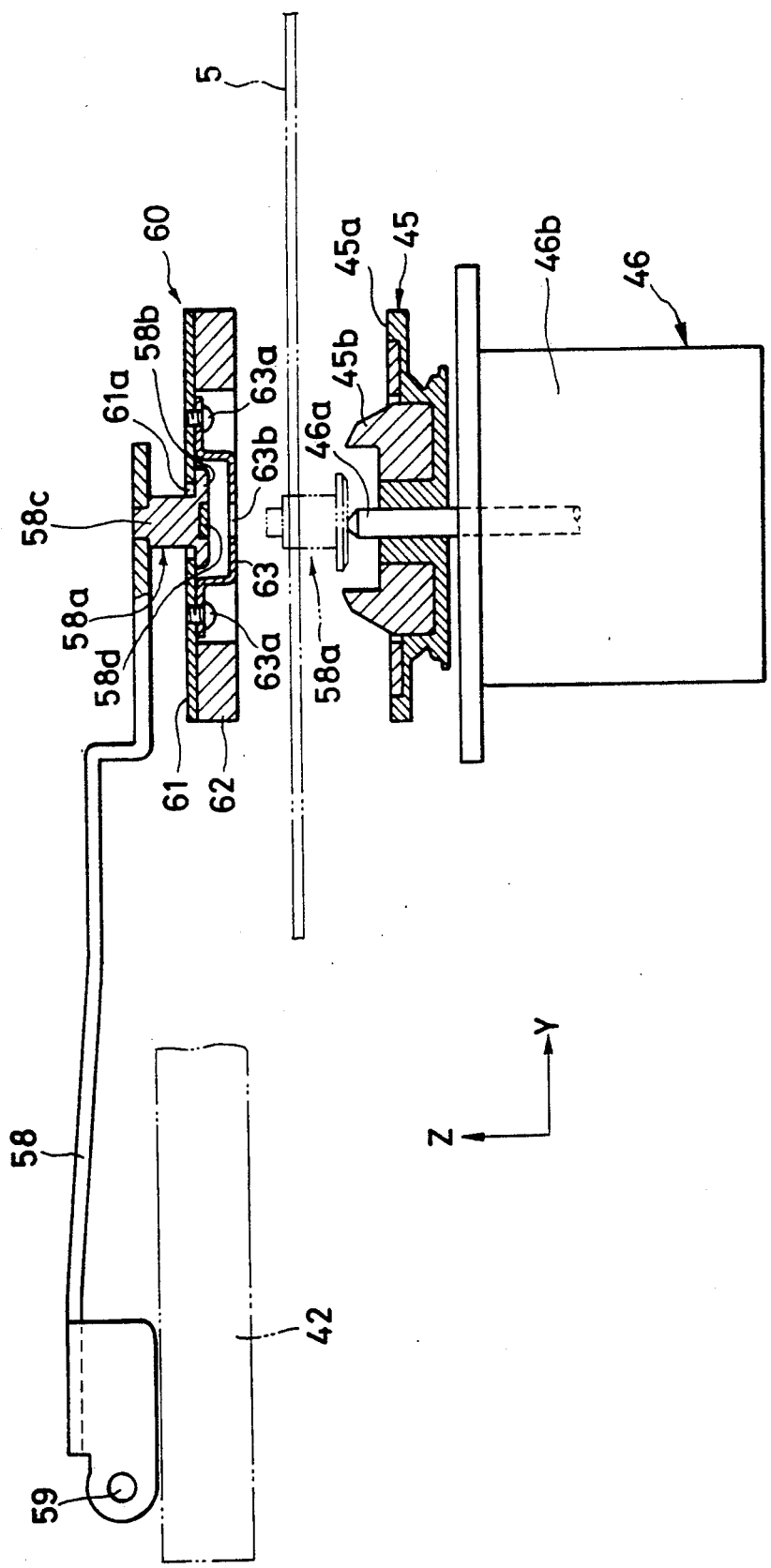

Below the chassis 7, as shown in FIG. 7, there is arranged a support member 42 which is formed in a rectangular shape. This support member 42 is attached to the lower surface of the chassis 7 through a vibration-insulating mechanism including four vibration-insulating members 43 made of soft rubber or the like. On that support member 42, there are supported a turntable 45 and a spindle motor 46 which acts as a drive source for directly driving the turn table 45. On the support member 42, there is also supported a guide shaft 47 which extends in parallel with a disk carrying surface 45a of the turntable 45 (as shown in FIG. 8). That is, the guide shaft 47 extends in the forward and backward directions, i.e., in the direction of the arrow Y and in the opposite direction. Also supported on the support member 42 is a carriage 48 which carries optical pickup means and is guided by the guide shaft 47. In parallel with this guide shaft 47, there is arranged a screw shaft 50 which is rotatably attached at its two end portions to the support member 42. A motor 51 is arranged in front of the screw shaft 50 so that the screw shaft 50 is rotationally driven by the motor 51 through a reduction gear mechanism 52 constructed of a plurality of gears. To the right side of the carriage 48, there is fixed in the form of a cantilever a rectangular leaf spring 53 which extends in the vertical directions, i.e., in the direction of the arrow Z. A pair of half nuts 54a and 54b are mounted on the free end portions of the leaf spring 53 at a predetermined spacing along the forward and backward directions, i.e., in the direction of the arrow Y. These half nuts 54a and 54b mesh with the screw shaft 50. Incidentally, these two half nuts 54a and 54b are integrally connected to each other by a connecting member 55.

The screw shaft 50, the motor 51, the reduction gear mechanism 52, the leaf spring 53, and the half nuts 54a and 54b, and their associated peripheral members together constitute a drive mechanism for driving the carriage 48. On the other hand, the drive mechanism, the support member 42, the turntable 45, the spindle motor 46, guide shafts 47a and 47b, and the carriage 48 together constitute the play means for performing the disk play.

Next will be described a clamp mechanism for clamping the disk 5 conveyed to the play position, i.e., for clamping onto the disk carrying surface 45a of the turntable 45.

Figure 9:
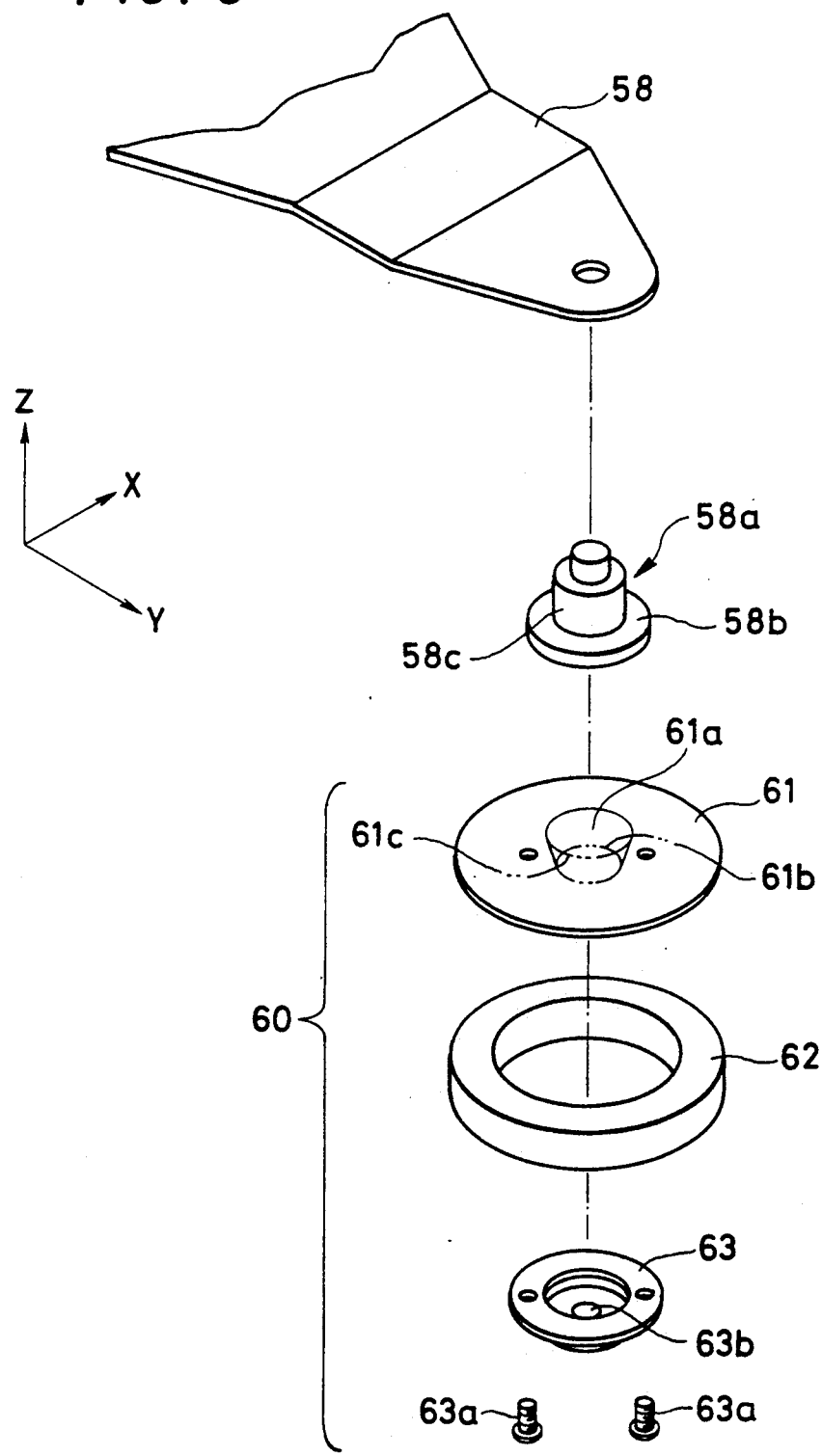

Above the support member 42 mounted on the chassis 7, as shown in FIG. 7 and 8, there is arranged a triangular arm member 58 which acts as a support member and which is hinged at its rear end portion to the support member 42 through a shaft 59 extending to the right and left in the direction of the arrow X. To the front free end portion of the arm member 58, as also shown in FIG. 9, there is rotatably attached a disk-shaped push member 60 which performs a disk clamping action in association with the turntable 45 and by the magnetic force of a magnet. Incidentally, the raised position of the arm member 58 shown in FIG. 8 will be called a "non-clamp position". On the other hand, the position of the arm member 58 when this arm member 58 is rocked downward by a predetermined angle so that the push member 60 comes into abutment against the surface of the disk 5 placed on the turnable 45 will be called a "clamp position". Thus, the arm member 58 moves between the clamp position and the non-clamp position with respect to the turntable 45.

The arm member 58 is equipped, as shown in FIGS. 8 and 9, at its free end with a columnar-shaped holder 58a. This holder 58a has its lower end formed with a disk-shaped expanded portion 58b and its upper end portion caulked and fixed to the body of the arm member 58. On the other hand, the push member 60 is equipped with a disk-shaped yoke 61 rotatably attached to the holder 58a by freely fitting it in a body portion 58c of the holder 58a at an opening 61a formed in the principal surface of the yoke 61. An annular magnet 62 is joined to the lower surface of the yoke 61 concentrically with the yoke 61. An arm-shaped positioning member 63 positions the yoke 61 with respect to the holder 58a such that the center of rotation of the yoke 61 is aligned with the axial center of the holder 58a. Here, the yoke 61 and the magnet 62 are joined by means of an adhesive, whereas the positioning member 63 is joined to the yoke 61 by screws 63a. As is apparent from FIG. 9, the opening 61a in the yoke 61 is freely fitted on the body portion 58c of the holder 58a. The opening 61a is defined on one lateral side by a first circle 61b which is positioned at the center of rotation of the yoke 61 and has a diameter slightly larger than the external diameter of the body portion 58c and is smaller than the external diameter of the expanded portion 58b of the holder 58a. The opening 61a is defined on the other lateral side by a second circle 61c which is offset from the center of rotation of the yoke 61 and has a diameter larger than the external diameter of the expanded portion 58b. The two circles 61b and 61c are smoothly joined such that the joined portion has a width (in the horizontal direction of FIG. 9) larger than the external diameter of the body portion 58b.

The previously mentioned arm member 58, shaft 59 and push member 60 together constitute a clamp mechanism for clamping the disk 5 onto the turntable 45 once the disk 5 has been conveyed close to the proper position.

As is apparent from FIG. 8, the spindle motor 46 for rotationally driving the turntable 45 is equipped with a spindle 46a which is connected to the turntable 45. The spindle 46a is rotatably borne by a bearing unit (not shown) mounted in a body 46b of the spindle motor 46. When the arm member 58 is in the aforementioned clamp position, the lower end of the holder 58a forming part of the arm member 58 engages with the top of the spindle 46a to push the spindle 46a toward the previously mentioned bearing unit (not shown), i.e., downward. For this purpose, the arm-shaped positioning member 63 or a component of the push member 60 is formed in its bottom with an opening 63b through which the spindle 46a can be inserted. Incidentally, the engaging portion of the holder 58a with the spindle 46a is equipped with a disk-shaped receiving member 58d which is made of a resin or the like for smoothing the engaging state. On the other hand, the turntable 45 is equipped with a guide member 45b, having an outwardly sloping top surface, which is fitted in the center hole of the disk 5 for guiding the disk 5 into the center of rotation of the turntable 45.

Here is briefly described the assembly procedure of the clamp mechanism described above.

First of all, the holder 58a forming part of the arm member 58 is caulked and fixed in advance to the body of the arm member 58. Independently of this, the disk-shaped yoke 61 and the annular magnet 62 are joined by means of the adhesive. Next, the expanded portion 58b of the holder 58a is inserted into the opening 61a formed in the yoke 61, more specifically, into the large, offset second circle 61c shown in FIG. 9. Subsequently the body portion 58c of the holder 58a is positioned in the small, concentric first circle 61b. In this state, the positioning member 63 is attached to the yoke 61 by the screws 63a. As a result, the holder 58a and the yoke 61 (including the magnet 62) are positioned substantially concentrically with respect to each other. Thus, the assembly of the clamp mechanism is completed. Incidentally, this clamp mechanism is operated by the movements of the aforementioned moving member 14.

Figure 10:
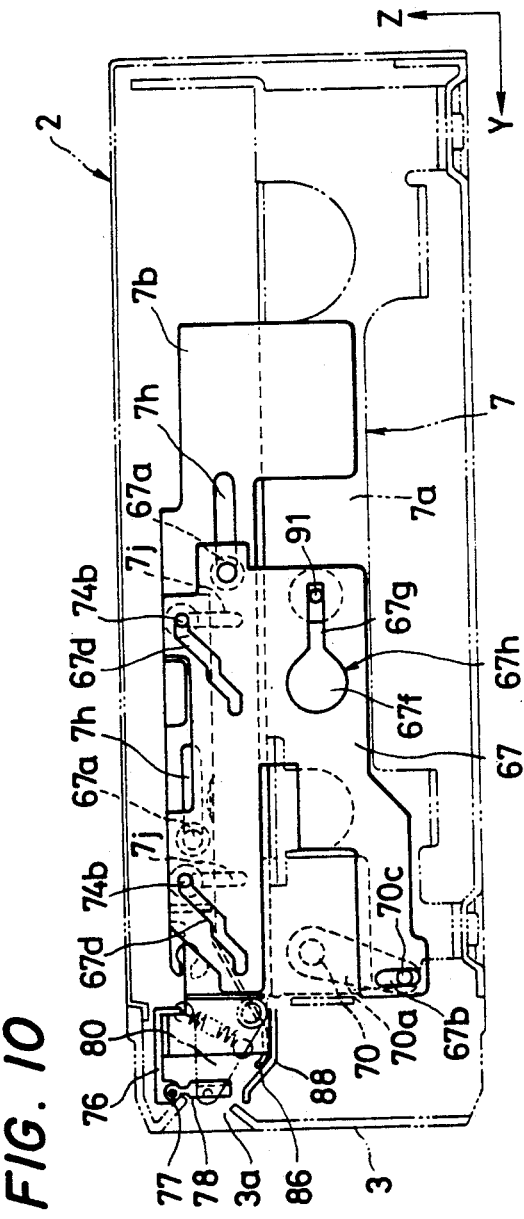
Figure 11:
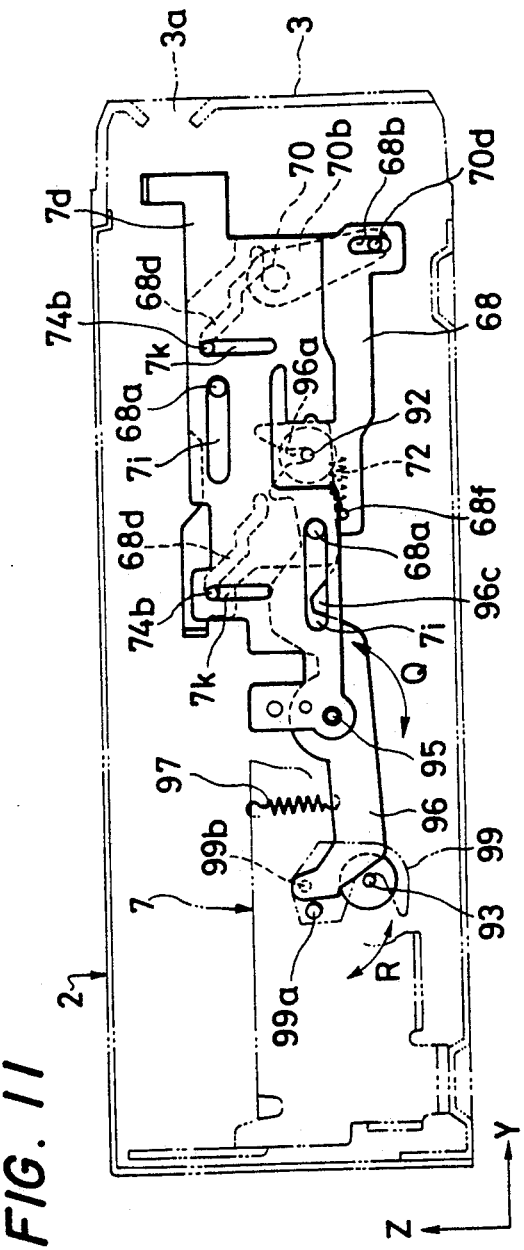

As shown in FIGS. 2 and 10, there is disposed at the right side of the righthand sub-chassis B 7b a moving plate 67 which is movable in the forward and backward directions, i.e., in the direction of the arrow Y and the opposite direction. As shown in FIGS. 2 and 11, there is disposed at the right side of the lefthand sub-chassis D 7d another moving plate 68 which is movable in the forward and backward directions. These moving plates 67 and 68 are shown in detail respectively in FIGS. 19(a) and 19(b) and FIGS. 20(a) and 20(b). More specifically, the plate 67 is carried by two slidable engaging pins 67a and the moving plate 68 by two corresponding pins 68a, which project from the two moving plates 67 and 68. The pins 67a and 68a engage respective pairs of slots 7h and 7i, shown in FIGS. 10, 11, 13(b) and 15(b), which are formed to extend in the forward and backward directions in the sub-chassis B 7b and D 7d.

Figure 3:
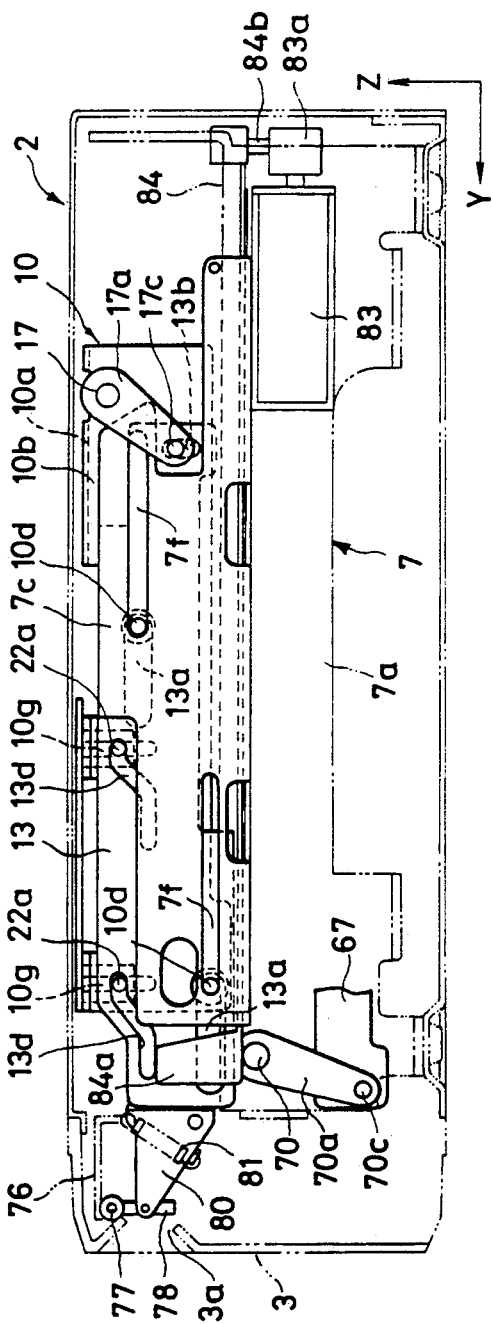
Figure 4:
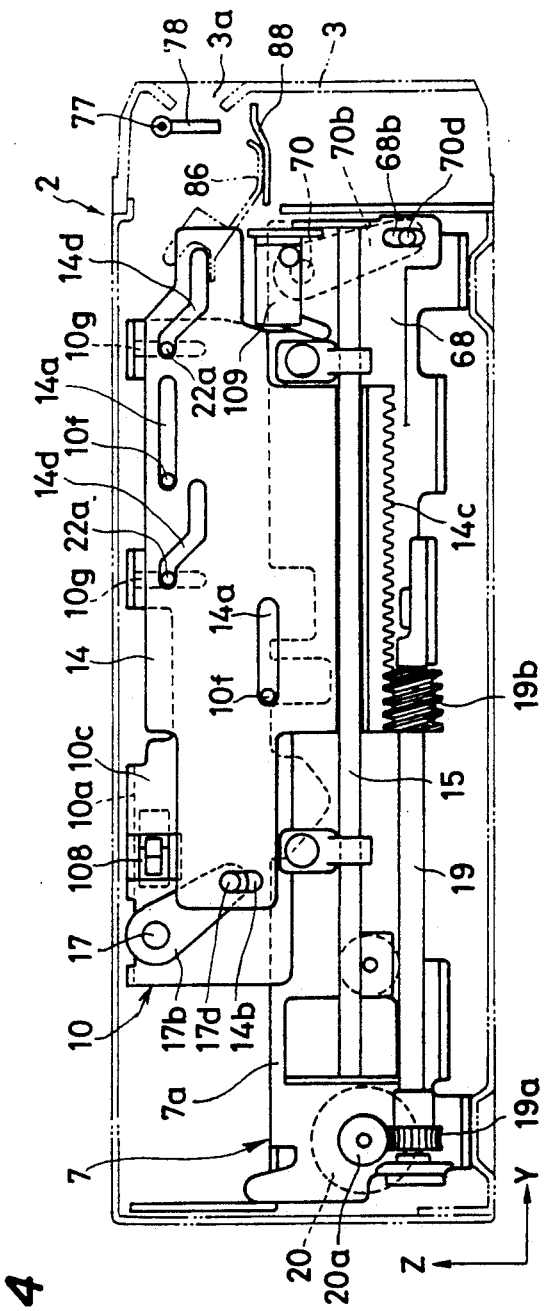
Figure 18A:
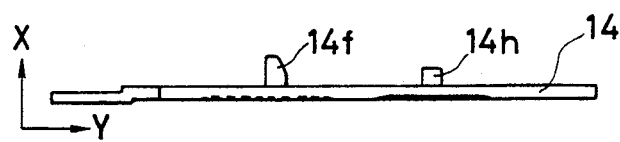

As shown in FIGS. 2, 3 and 4, at the front end of the chassis 7, a coacting shaft 70 extends to the right and left and has arms 70a and 70b fixed to its two ends. The coacting shaft 70 is rotatably borne in the chassis 7. From the respective leading end portions of the arms 70a and 70b, projecting pins 70c and 70d are slidably engaged with slots 67b and 68b (FIGS. 10 and 11) formed in the respective rear ends of the moving plates 67 and 68 and extending in the vertical directions, i.e., in the direction of the arrow Z. In other words, in accordance with the reciprocal movement of one moving plate 67, the other moving plate 68 is also reciprocated. Incidentally, the moving plate 68 is moved backwards in accordance with the backward movement of the leftside moving member 14 because a projection 14h (as shown in FIGS. 2 and 18(a)) projecting from the aforementioned moving member 14 engages the rear end bent portion 68c (as shown in FIG. 2.) of said moving plate 68. Incidentally, the forward returning movements of the moving plates 67 and 68 are performed by the biasing force of a coil spring 72 (as shown in FIG. 11) which is connected to the moving plate 68.

In a position between the aforementioned paired moving plates 67 and 68, as shown in FIG. 1, 2, and 21(a)-21(d), there is arranged a flat plate-shaped guide member 74 which has its upper surface slidably contacting with the principal surface of the disk 5 inserted from the slot 3a formed in the housing 2, to thereby guide said disk to just below the container 22. Incidentally, a felt sheet 74a (as shown in FIG. 21(a)) is adhered to such a portion of the upper surface of the guide member 74 as contacts with the principal surface of the disk 5. On each of the right and left ends of the guide member 74, as is apparent from FIG. 21(a), there is formed one pair of a total of four pins 74b which extend to the right and left. The guide member 74 is carried and is movable in the vertical direction within a predetermined range as a result that those respective pins 74b are slidably engaged with one pair of slots 7j and 7k (FIGS. 10, 11, 13(b) and 15(b)) formed in each of the sub-chassis B 7b and D 7d and extending in the vertical directions, i.e., in the direction of the arrow Z. Moreover, those respective pins 74b formed to project from the guide member 74 are engaged not only with the slots 7j and 7k of the sub-chassis B 7b and D 7d but are also slidably with cam slits 67d and 68d formed in the aforementioned moving plates 67 and 68, respectively. The cam slits 67d and 68d are generally sloped upward and backward, i.e., in the direction opposite to that of the arrow Y). In accordance with the forward and backward movements of the respective moving plates 67 and 68, more specifically, the guide member 74 is moved upward and downward.

Figure 12:
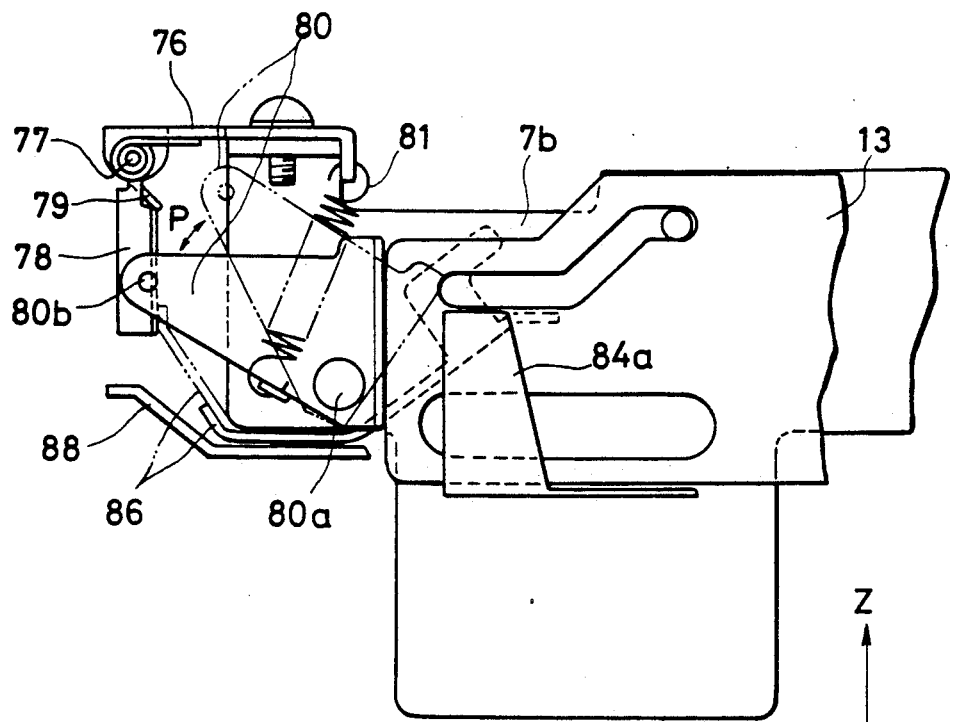
Figure 13A:
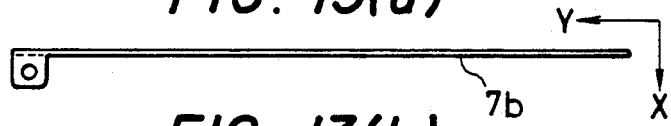
Figure 13B:
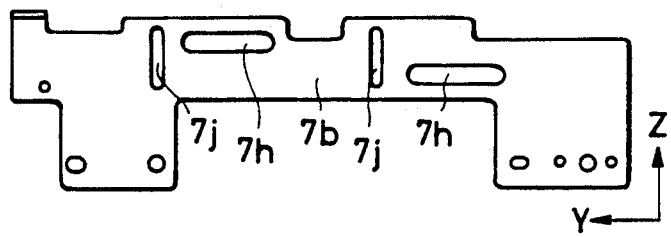
Figure 14A:
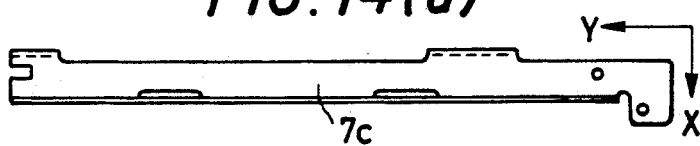
Figure 14B:
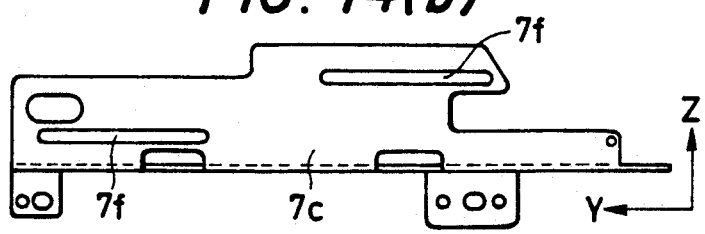
Figure 15A:
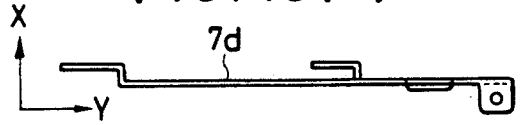
Figure 15B:
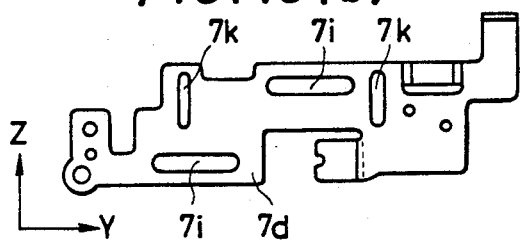
Figure 16D:
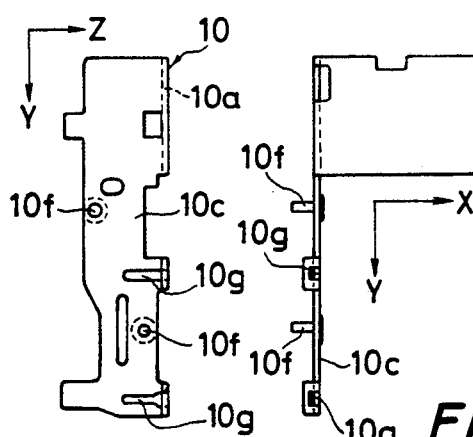
Figure 16A:
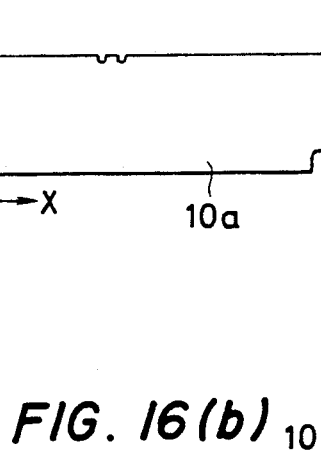
Figure 16C:
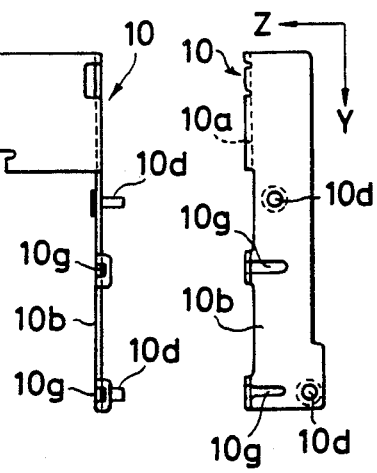
Figure 16B:
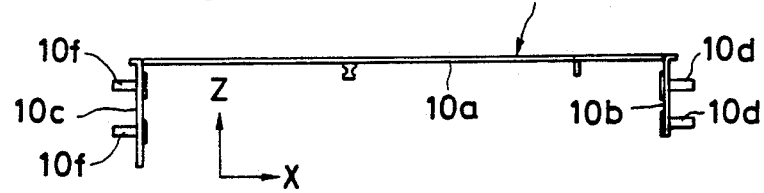

As shown in FIG. 2, a bracket 76 is mounted between the respective front ends of the sub-chassis B 7b and D 7d. To a lower portion of the bracket 76, as shown in FIGS. 3 and 12, for example, there is attached a shaft 77 which extends to the right and left, i.e., in the direction of the arrow X and in the opposite direction. To this shaft 77, there is hinged in a rocking manner the upper end of a cover 78 for closing the slot 3a from the inside. The cover 78 is biased outwardly toward its shut position, in which it covers the slot 3a. The biasing is performed by the action of a spring member 79 which is fitted on the shaft 77.

As is apparent especially from FIG. 12, a turn lever 80 is so hinged to the front end of the sub-chassis B 7b through a pin 80a as to rock freely in the direction of arrow P. This turn lever 80 is equipped at its free end with a pin 80b for coming into abutting contact with the front surface of the cover 78 to rock the cover 78 toward an open position. Incidentally, the turn lever 80 is biased clockwise of FIG. 12 by the action of a coil spring 81. As shown in FIG. 12, the front end of the aforementioned moving member 13 can come from the rear into abutting contact with the free end of the turn lever 80. When the moving member 13 moves backward, i.e., in the direction opposite to that of the arrow Y, the turn lever 80 is turned clockwise (FIG. 12) by the coil spring 81 so that the cover 78 is moved to its position by its spring 79. When the moving member 13 is in its front limit position (i.e., the position shown in FIG. 12), on the other hand, the turn lever 80 is turned counterclockwise by the moving member 13 so that the cover 78 biased by the spring 79 shuts the slot 3a. In short, the cover 78 is held in its closed and open positions by the action of the (aforementioned) disk conveying mechanism including the moving member 13. Incidentally, the spring member 79, the turn lever 80 including the pin 80a, and the coil spring 81, as described above, are also incorporated together into said disk carrying mechanism.

To the rear end portion of the sub-chassis C 7c, as shown in FIG. 3, there is fixed a solenoid plunger 83. This solenoid plunger 83 is provided to move the cover 78 temporarily to the shut position. As shown in FIG. 3, more specifically, there is arranged a lever 84 which extends forward and backward along the whole length of the sub-chassis C 7c and is attached thereto in a manner to freely reciprocate forward and backward. The lever 84 is formed at its front end portion with an abutment portion 84a for abutment engagement with the back of the turn lever 80. The rear end of the lever 84 is connected to the plunger 83a of the solenoid plunger 83 by means of a pin 84b. More specifically, the plunger 83a of the solenoid 83 is retracted to move the lever 84 forward so that the abutment portion 84a of the lever 84 turns the turn lever 80 counter-clockwise (FIGS. 3 and 12) to move the cover 78 to the shut position.

As shown in FIG. 10, 12 and FIGS. 21(a)-21(d), for example, there is attached to the front end of the guide member 84 an insertion preventing member 86 for preventing the insertion of a second from the slot 3a of the housing 2. This insertion preventing member 86 is made movable between an (insertion) preventing position, as indicated by double dotted lines in FIG. 12, and a non-preventing position, as indicated by solid lines. As shown in FIGS. 21(a) and 21(b), the insertion preventing member 86 is formed at its two right and left sides with small bent portions 86a which are smoothly fitted in circular openings 74c formed in the two right and left end portions of the guide member 74. As a result, the insertion preventing member 86 can rock on that bent portions 86a so that it can move between the aforementioned preventing and non-preventing positions.

As shown in FIG. 12, for example, there is positioned below the insertion preventing member 86 a tongue 88 which is fixed on the chassis 7. The insertion preventing member 86 moves upward and downward together with the guide member 74 such that it rocks around its bent portions 86a (as shown in FIG. 21(a) and) between the aforementioned preventing and non-preventing positions, while being pushed to the tongue 88, when it moves upward and downward. The guide member 74 is driven by the aforementioned disk carrying mechanism so that the insertion preventing member 86 is conveyed by said disk conveying mechanism.

Incidentally, the movement of the front cover 78 is effected when the insertion preventing member 86 moves to the non-preventing position. This construction makes it unnecessary to form the cover 78 with any notch for preventing the collision with the insertion preventing member 86.

Next, the following description is directed to lock means for locking the support member 42 (which supports the play means including the turntable 45) with respect to the housing 2, i.e., to the chassis 7, while the disk is not being played.

As shown in FIG. 7, there are anchored on the support member 42 a total of three lock pins 91, 92 and 93, one of which is located at the left and the other two at the right. These respective lock pins extend to the left and right.

As shown in FIG. 10, on the other hand, the rear end of the moving plate 67 arranged at the right of the chassis 7 is formed at its lower portion with an opening 67h, which is formed of a circular portion 67f and a straight portion 67g extending from the rear end of the circular portion 67f and in which the lock pin 91 of the support member 42 is fitted. When this lock pin 91 comes into the straight portion 67g of the opening 67h, it is locked with respect to the moving plate 67. Accordingly, it is also locked to the chassis 7 so that the locked state is released when the lock 91 returns to the circular portion 67f.

As shown in FIG. 11, the chassis 7 is formed at its lefthand side with a pin 95 which extends to the right and left (i.e., i the direction of the arrow x and in the opposite direction) and to which a longitudinal lock plate A 96 is attached at its middle portion in a manner to rock in the direction of arrow Q. A coil spring 97 is connected to the lock plate A 96 so that said lock plate A 96 is biased clockwise in FIG. 11 by the coil spring 97. The lock plate A 96 is formed at its front end with a notch 96a which is brought into engagement with the lock pin 97 of the support member 42 by the counter-clockwise rotation of the lock plate A 96 to lock the lock pin 92. In the lower, middle portion of the lock plate A 96 is formed a cam surface 96c which is slidably engaged with a pin 68f projecting from the moving plate 68 arranged at the left side of the chassis 7. More specifically, the lock plate A 96 is turned both by the movement of the pin 68f along the cam surface 96c in accordance with the forward and backward movements of the moving plate 68 and by the action of the coil spring 97.

At the rear end portion of the lock plate A 96, there is arranged a lock plate B 99 which has a generally crescent shape and which is so attached to the chassis 7 through a pin 99a as to rock freely in the direction of the arrow R. That lock plate B 99 is engaged with the lock pin 93 of the support member 42 to lock the lock plate B 96 with respect to the chassis 7. The lock plate B 99 has its free end portion hinged to the rear end portion of the lock plate A 96 by means of a pin 99b so that it is rocked in accordance with the rotation of the lock plate A 96.

The aforementioned lock pins 91, 92 and 93, moving plate 67, lock plate A 96, coil spring 97 and lock plate B 99 together constitute with their associated peripheral members lock means for locking the support member 42 with respect to the chassis 7 and accordingly to the housing 2 when playing of the disk is not performed.

As shown in FIG. 2, the body 10a of the tray 10 is equipped at its front end portion with a pin 101 which extends upward and downward To this pin 101, there is attached a lever 102 which extends to the right and left over substantially all the length of the tray body 10a such that it can turn at its central portion in the direction of arrow S. From the right end of the lever member 102, there is formed a projection 102a with engages the outer circumference of the disk 5 positioned in a predetermined position of the container 22. The right end of the level 102 is also formed with another projection 102b which with the actuator of a detecting switch 104 fixed on the lower surface of the right side portion of the body 10a of the tray 10. The detecting switch 104 detects that the disk 5 has been positioned in the predetermined position of the container 2.

The left end of the level 102 is formed with a projection 102c which extends backward (i.e., in the direction opposite to that of the arrow Y) so that it can come into abutment engagement with a rising rear wall 7m formed at the rear end of the chassis 7. When the tray 10 moves backward to reach its backward moving limit position, that projection 102c abuts against the rear wall 7m so that the lever 102 is turned counter-clockwise in FIG. 2. Incidentally, the lever 102 is given a biasing force in the clockwise direction in FIG. 2 by the action of a coil spring 105.

From the left end portion of the lever 102, there is also formed another projection 102d which comes into engagement with the actuator member of a detecting switch 106 mounted on the lower surface of the left side of the body 10a of the tray 10. The detecting switch 106 detects that the tray 10 has reached it backward moving limit position.

As also shown in FIG. 2, the left side of the body 10a of the tray 10 is equipped on its lower side with a detecting switch 108 which engages with the rear end of the moving member 14 to detect that the moving member 14 has reached its backward moving limit position. At the front of the left end of the chassis 7, as shown in FIG. 4, there is arranged another detecting switch 109 which has its actuator engaged with the moving member 14 for detecting that the moving member 14 has reached its forward moving limit position. In a predetermined position of the support member 42 for supporting the play means, as shown in FIG. 7, there is also disposed a detecting switch 110 for detecting that the carriage 48 has reached its home position, i.e., in a still position before the start of the play.

Figure 29:
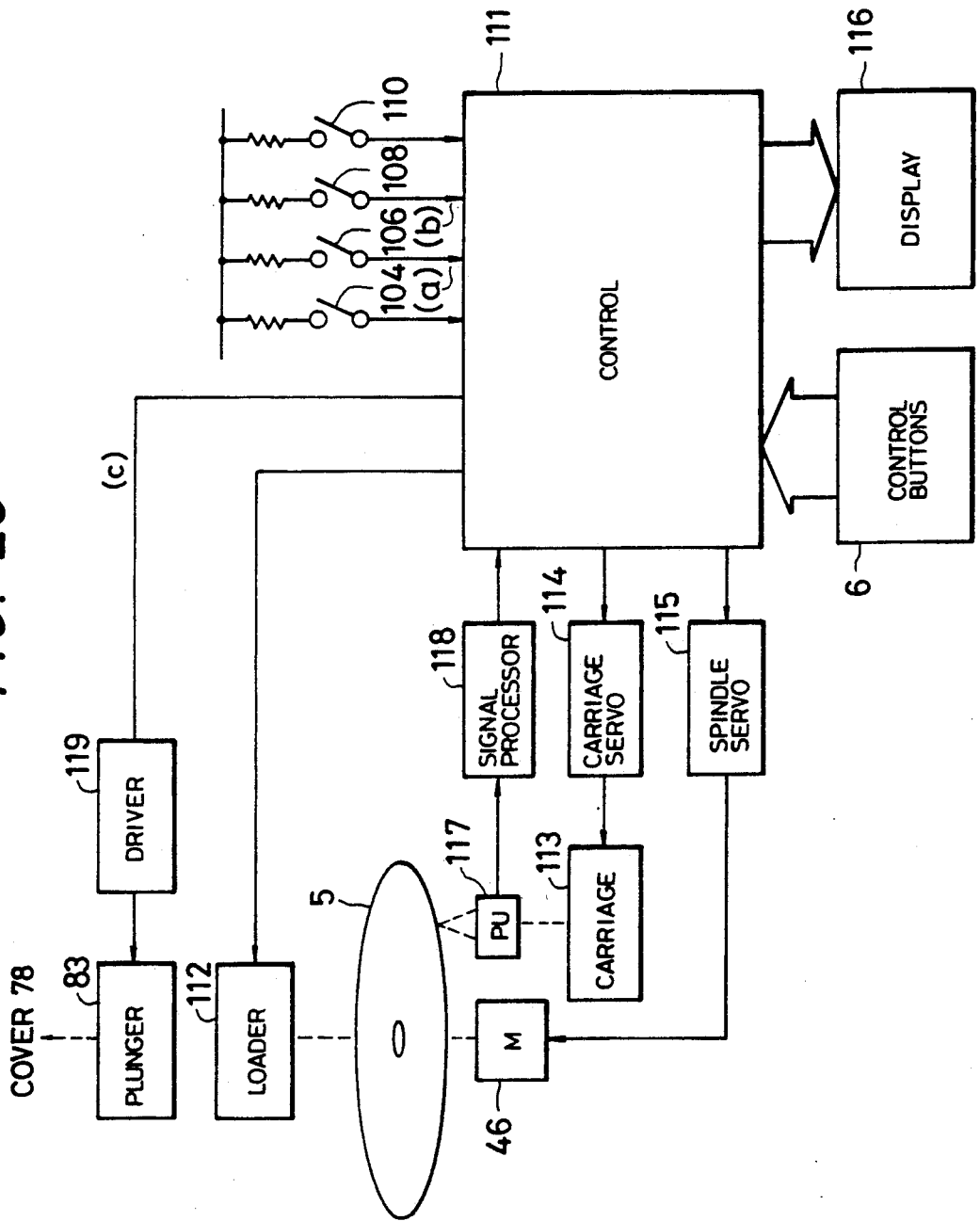
FIG. 29 is a block diagram showing the control system.

The respective signals generated from the aforementioned grouped control buttons 6 on the front panel of the disk player 1 and from the respective detecting switches 104, 106, 108, 110 and so on are transmitted to a control circuit 111, shown electrically in FIG. 29, which is located within the housing 2.

FIG. 29 shows a block diagram of a control system, in which the control circuit 111 is constructed of a micro computer having a built-in memory, for example.

On the basis of the respective signals generated from the grouped control buttons 6, the respective detecting switches 104, 106, 108 and 110 and so on, the control circuit 111 drives a loading mechanism 112, a carriage mechanism 113, the spindle motor 46 and so on at timings to be described later. The carriage mechanism 113 and the spindle motor 46 are driven by the control circuit 111 through a carriage servo circuit 114 and a spindle servo circuit 115. The control circuit 111 also outputs display information to a display 116 for exhibiting a variety of displays. The control circuit 111 is fed with information read out from the disk by a pickup 117 after the information has been processed, e.g., demodulated by a signal processing circuit 118. The control circuit 111 further drives the aforementioned solenoid plunger 83 through a drive circuit 119.

Figure 30:
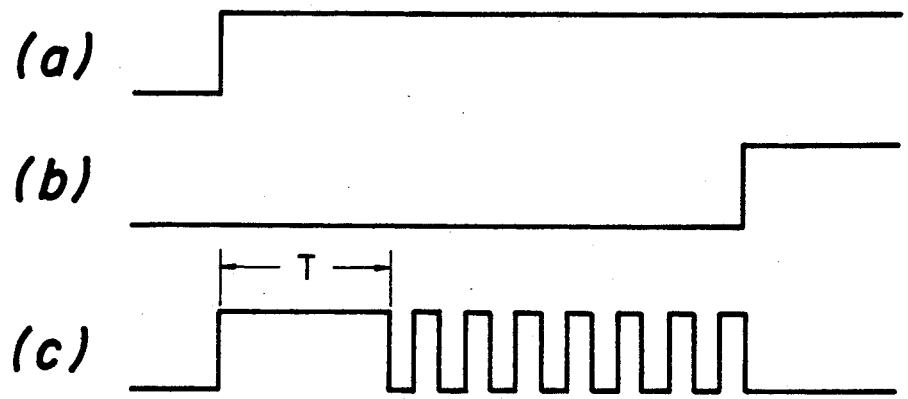
FIG. 30 is a waveform chart for explaining the method of driving the solenoid plunger of FIG. 29.

That solenoid plunger 83 is driven for shutting off the cover 78 in a disk loading process. In the driving of this solenoid plunger 83, the control circuit 111 feeds the drive circuit 119, as shown in a timing chart of FIG. 30, with a drive pulse (c) having a pulse width of constant time T in response to the detected output (a) of the detecting switch 16, which detects that the tray 10 (as shown in FIG. 2) of the loading mechanism 112 has reached its backward moving limit position. The control circuit 111 then feeds the drive circuit 119 with a drive pulse train (c) with a duty cycle of about 50% after the lapse of the constant time period T. The control circuit 111 also interrupts the drive of the solenoid plunger 83 in response to the detected output (b) of the detecting switch 108 detecting the completion of the loading operation, i.e., that the moving member 14 (as shown in FIG. 2) of the loading mechanism 112 has reached its backward moving limit position.

Thus, since the drive circuit 119 is fed with both the drive pulse having the width of the constant time period T at the start of the drive of the solenoid plunger 83 and the drive pulse train having the duty cycle of about 50% after lapse of the constant time period T, the solenoid plunger 83 is fed with a large current necessary for its intake stroke when it is driven and with such a small holding current as can barely hold the withdrawn state after the intake.

Incidentally, the drive pulse train of about 50% duty cycle can be easily produced by the micro computer constituting the control circuit 111.

Figure 31:
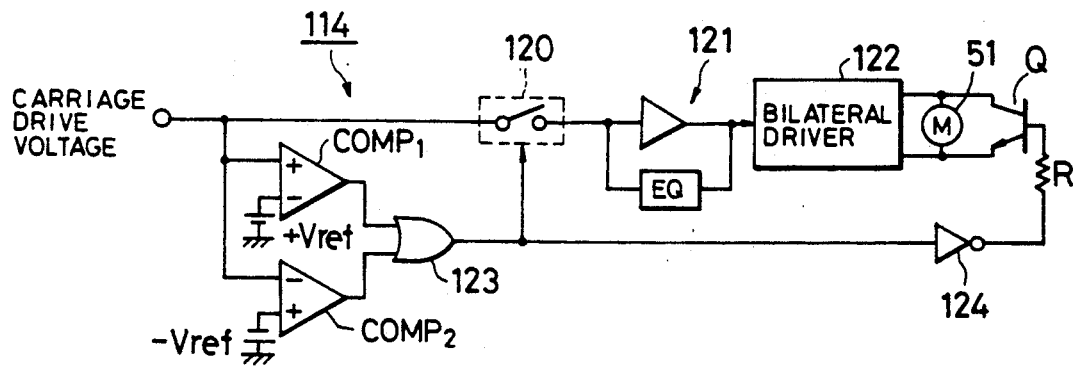
FIG. 31 is a block diagram showing the construction of the carriage servo circuit of FIG. 29.

FIG. 31 shows the circuity of the carriage servo circuit 114. As shown, a carriage drive voltage for driving the carriage motor 51 is fed to a bilateral drive circuit 122 through a loop switch 120 and an equalizer circuit 121. The bilateral drive circuit 122 drives the carriage motor 51 in both the forward and backward directions in accordance with the polarity of a drive voltage. This carriage drive voltage is used not only as a non-inverted input of a comparator $COMP_1$ referenced to the inverted value of a reference voltage $+V_{ref}$ but also as an inverted input of a comparator $COMP_2$ referenced to the negative reference voltage $-V_{ref}$. These reference voltage $+V_{ref}$ and $-V_{ref}$ are set to correspond to the insensitive band of the carriage motor 51. The respective outputs of the comparators $COMP_1$ and $COMP_2$ become two inputs of an OR gate 123, which generates an output at a high level when the carriage drive voltage is higher than $+V_{ref}$ or lower than $-V_{ref}$. The output of the OR gate 123 is fed to the loop switch 120 to provide both an on/off control signal for the loop switch 120 and an on/off control signal for a transistor Q acting as a short-circuit for short-circuiting the two ends of the motor 51 through an inverter 124 and a resistor R.

Figure 32:
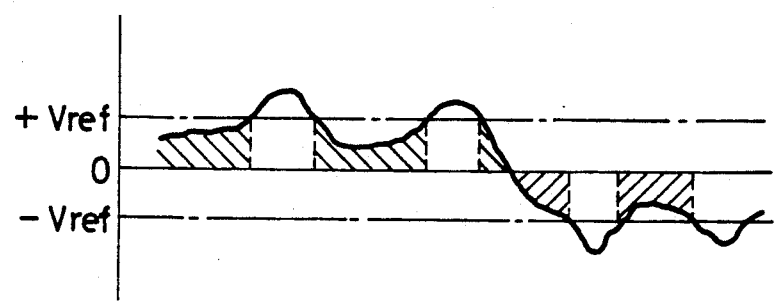
FIG. 32 is a waveform chart for explaining the circuit operations of FIG. 31.

In the carriage servo circuit 114 thus constructed, when the drive voltage is within the range from $+V_{ref}$ to $-V_{ref}$, the output of the OR gate 123 is at a low level. Therefore, the loop switch 120 is turned off (or opened) to open the servo loop. As a result, within the range of the drive voltage from $+V_{ref}$ to $-V_{ref}$, the bilateral drive circuit 122 receives no drive voltage so that current which is so small as to make no contribution to the start of the motor does not flow, as shown in FIG. 32. Thus, the power consumption can be reduced to the extent of the hatched portion of FIG. 32. At this time, the motor 51 has its two ends short-circuited by the transistor Q in its ON state to have its rotor fixed so that the carriage 48 (as shown in FIG. 7) is not troubled by any motion caused by external vibrations.

When the carriage drive voltage is higher than $+V_{ref}$ and lower than $-V_{ref}$, on the other hand, the output of the OR gate 123 takes the high level so that the loop switch 120 is turned on (or closed) so that the drive of the motor 51 is effected in accordance with the polarity and level of the drive voltage. At this time, the transistor Q is left in its OFF state.

Next, the operations of the auto-loading disk player thus constructed will be briefly described in the playing procedures. Incidentally, FIGS. 1 to 12 show the initial state before the disk player 1 is played.

First of all, as shown in FIG. 1, the disk 5 is inserted through the slot 3a into the housing 2. Here, the disk 5 proceeds while pushing the cover 78 (as shown in FIGS. 3 and so on) which normally covers the slot 3a. When the disk 5 is inserted half-way into the housing 2, its outer circumference comes into engagement with the front two of the four pins 33a and 34a fixed on the gripping members 33 and 34 shown in FIG. 5 so that it advances while forcing the front two pins to the sides. When the center of rotation of the disk 5 passes over the line joining the axial centers of those front two pins 33a and 34a on the left and right, the disk 5 is pulled into the housing 2 even if it is released from the user's hand, because the two pins 33a and 34a are biased (by the action of the coil spring 36) toward the center of the disk, now behind the front pins At this time, moreover, the guide member 74 effectively guides the disk 5 to the predetermined position of the container 22 and is gripped by the all four of the pins 33a and 34a. At this time, incidentally, even if the disk 5 is inserted in a more or less inclined manner, this inclination is corrected by the action of the centrally tapered portion 33d of the pins 33a and 34a shown in FIG. 6. Since the disk 5 is gripped by those four pins 33a and 34a, as described above, moreover, the disk 5 will not be displaced out of position, if once positioned, even with more or less external vibration.

Simultaneously as the disk 5 is positioned with respect to the container 22, its outer circumference comes into engagement with the projection 102a of the lever 102 shown in FIG. 2 so that the lever 102 is turned in FIG. 2 around the pin 101 by a counterclockwise a predetermined angle. As a result, the detecting switch 104 is operated Then, the motor 20 starts its rotations so that the moving members 14 and 13 are driven backward by means of the worm shaft 19 and so on. The container 22 is locked with respect to the tray 10 by the aforementioned locking and releasing means so that only the moving members 14 and 13, the tray 10 and the container 22 are moved backward in accordance with the rotations of the motor 20.

When the tray 10 and the container 22 move backward a predetermined distance so that the disk 5 carried on the container 22 comes into alignment with the axis of rotation of the turntable 45, the aforementioned locking and releasing means operates to lock the tray 10 with respect to the chassis 7 and to release the locked state of the container 22 with respect to the tray 10.

Moreover, the projection 102d of the aforementioned lever 102 actuates the detecting switch 106. Thus, the backward movements of the moving members 14 and 13 only are continued until the state shown in FIGS. 22 to 28 is reached. The operations of the respective members accompanying the backward movements of the moving members 14 and 13 only will be described in the following.

Figure 17A:
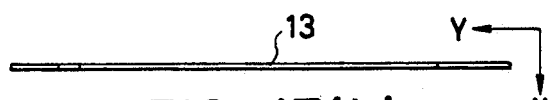
Figure 17B:
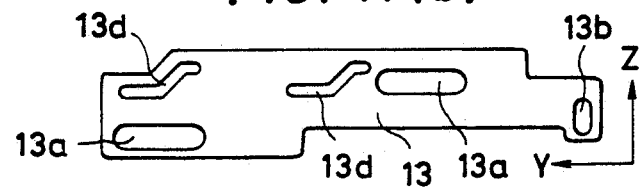
Figure 18B:
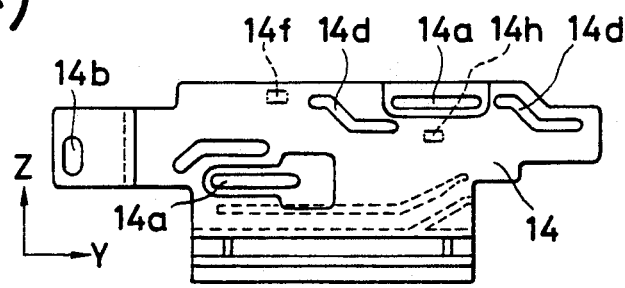
Figure 18C:
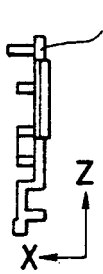
Figure 19A:
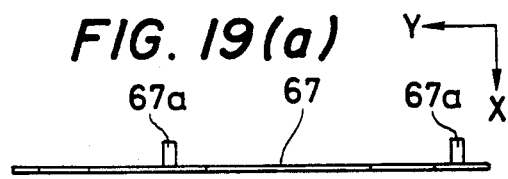
Figure 19B:
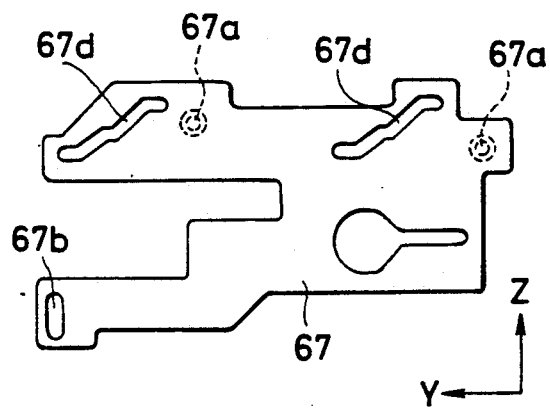
Figure 20A:
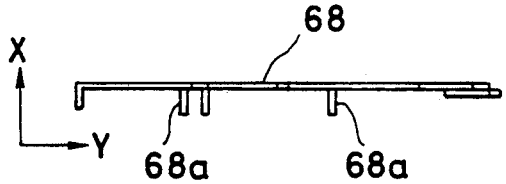
Figure 20B:
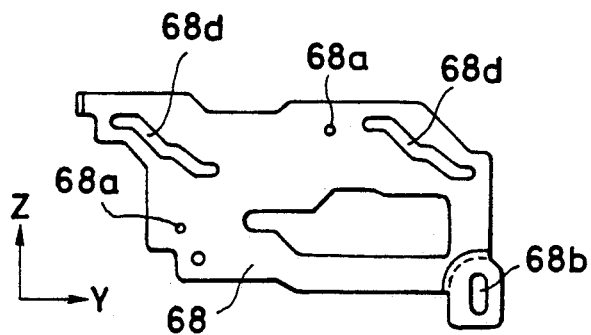
Figure 20C:
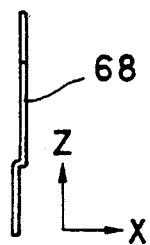
Figure 22:
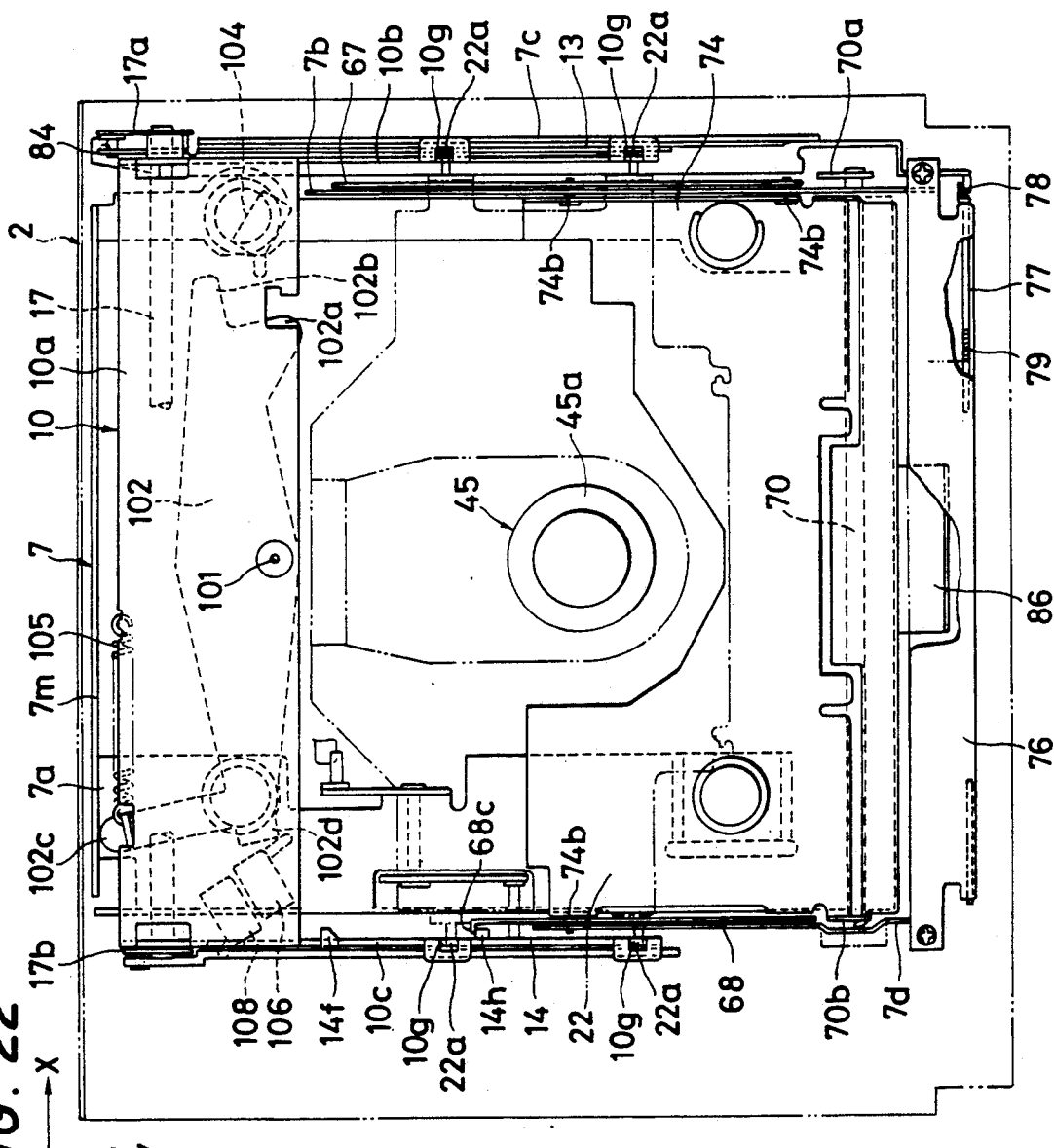
FIGS. 22 to 28 are views for explaining the operations of a auto loading disk player.
Figure 23:
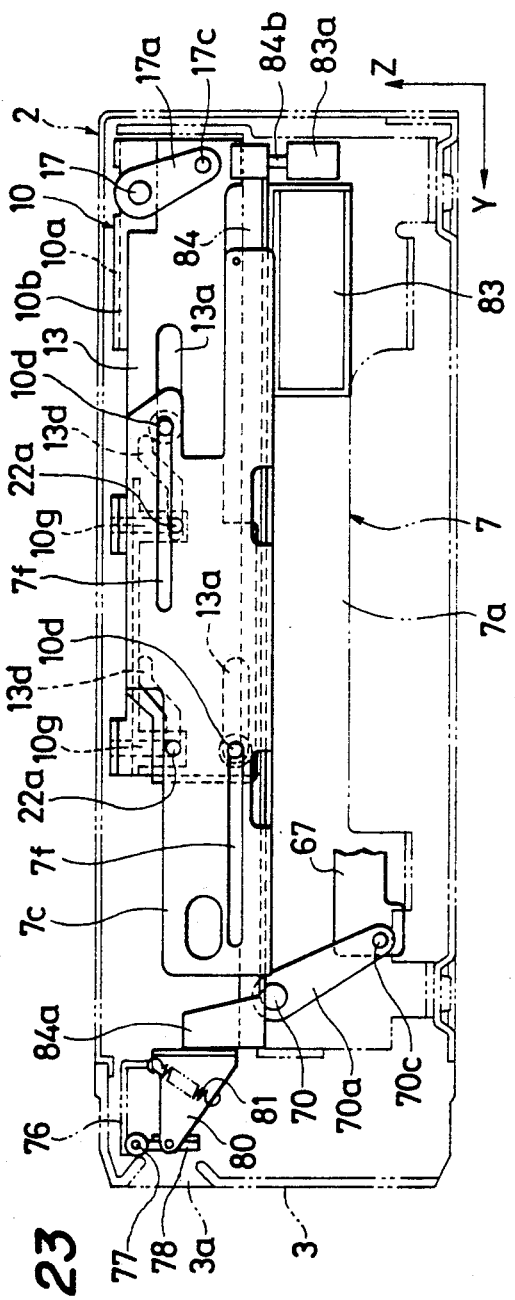
Figure 24:
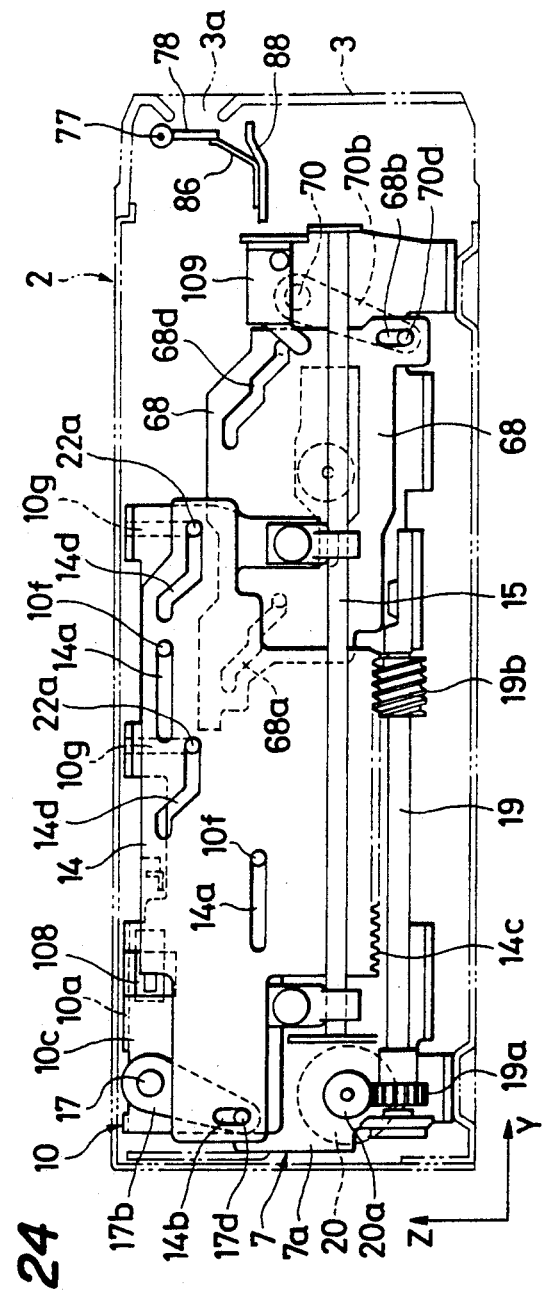
Figure 25:
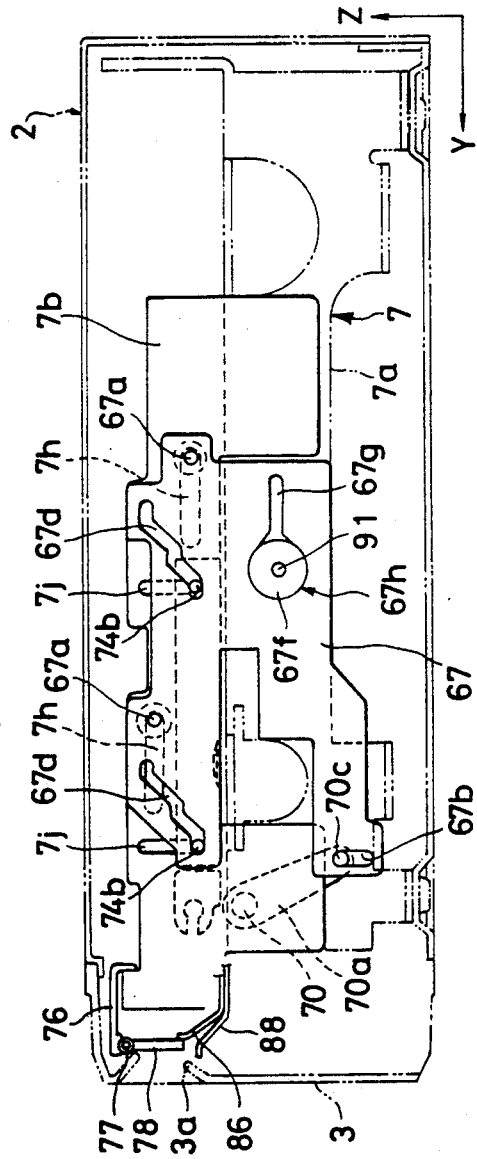
Figure 26:
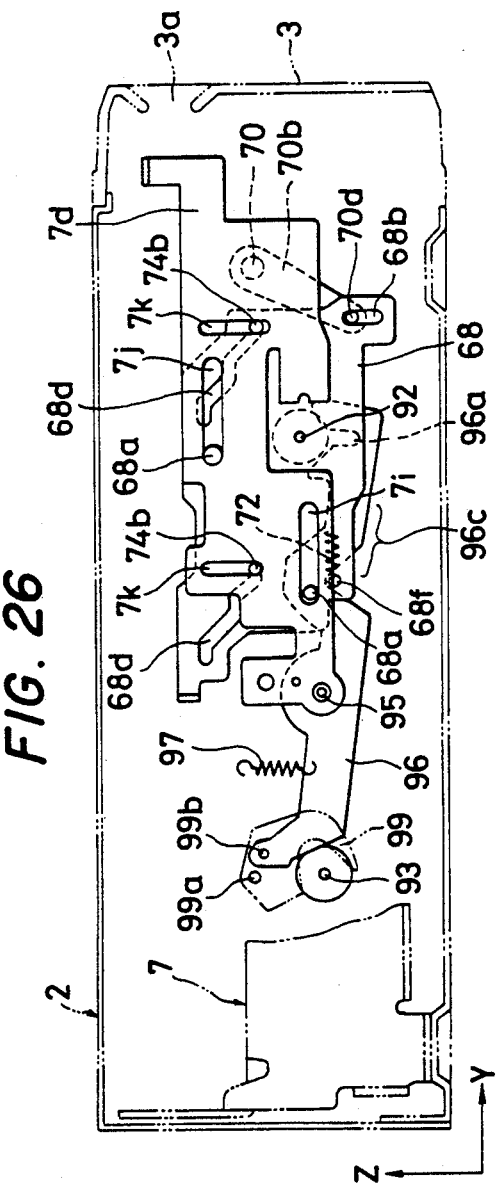
Figure 27:
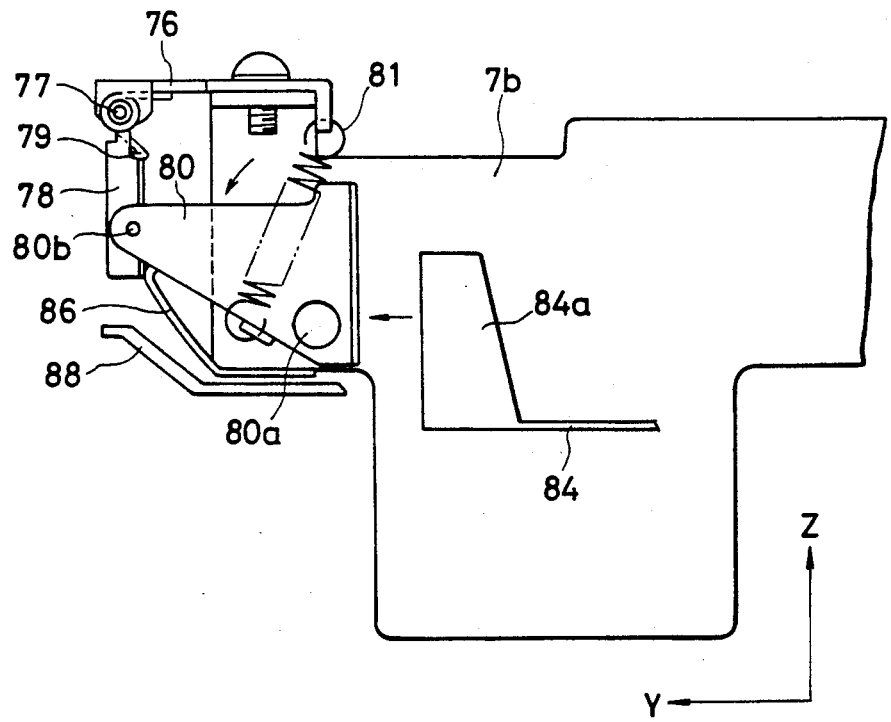

As is apparent from FIGS. 22 to 24, the four pins 22a anchored at the two right and left end portions of the container 22 slide along the sloping slits cam 13d and 14d formed in the moving members 13 and 14 (FIGS. 17(b) and 18(b)) so that the container 22 drops while carrying the disk. As shown in FIGS. 25 and 26, on the other hand, the moving plates 67 and 68 are driven backward by the backward movement of the moving member 14 so that the guide member 74 engaging with the cam slits 67d and 68d of the respective moving plates 67 and 68 also drops. As a result, the insertion preventing member 86 attached to the guide member 74 moves to the state shown in FIG. 25. Immediately before the movement of that insertion preventing member 86, as shown in FIG. 27, a lever member 89 has already been driven forward by the solenoid plunger 83 (as shown in FIG. 3), and its abutment portion 84a pushes the turn lever 80 from the back to turn the turn lever 80 counter-clockwise so that the cover 78 is positioned in its shut position. Therefore, the insertion preventing member 86 supports the back of the cover 78 to prevent the double insertion of disks. Incidentally, the power supply to the solenoid plunger 83 is then instantly interrupted.

As shown in FIG. 26, moreover, as the lock plate A 96 is turned clockwise of the same Figure around the pin 95 by the backward movement of the moving plate 68 and by the action of the coil spring 97, the lock plate B 99 is also turned counter-clockwise around the pin 99a to thereby release the locked states of the lock pin 92 and 93 with respect to the chassis 7 and accordingly to the housing 2. As shown in FIG. 25, on the other hand, the remaining lock pin 91 is released from its locked state by the backward movement of the other moving plate 67 to thereby release the locked state of the supporting member 42 (as shown in FIG. 7), which carries the play means including the turntable 45, with respect to the housing 2.

Figure 28:
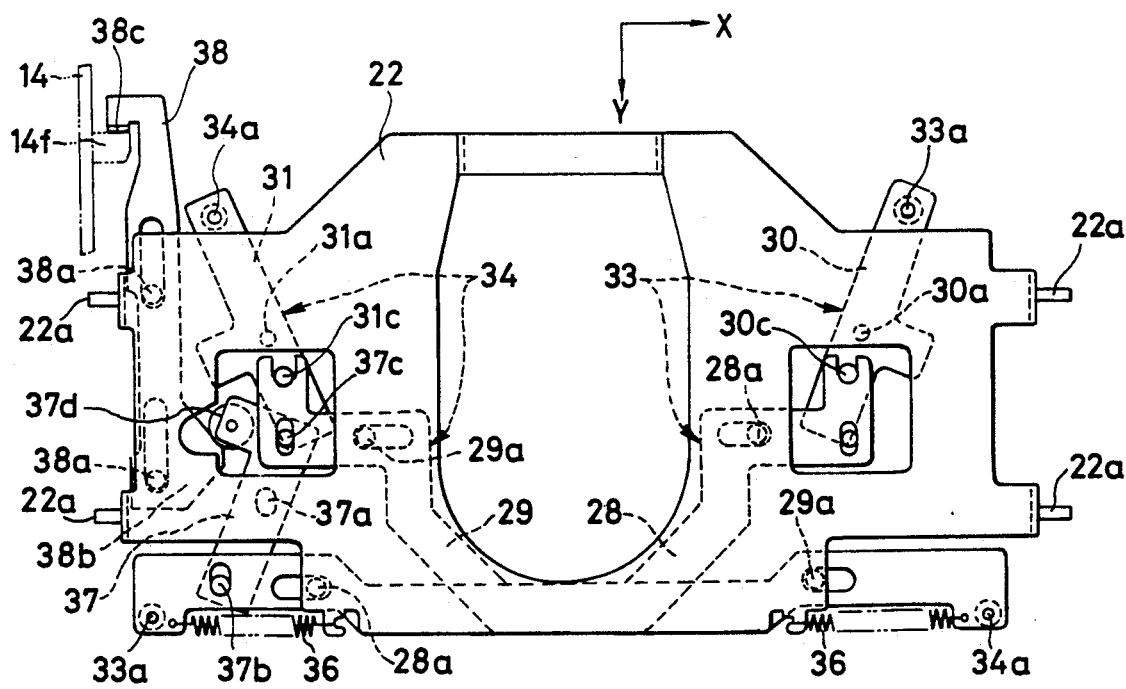

The disk 5 is placed on the turntable 45 by the downward movement of the aforementioned container 22. By the final action of the moving member 14, moreover, the disk clamp is effected, and the disk 5 is released from its gripped state by the respective pins 33a and 34a anchored at the container 22, as shown in FIG. 28.

When the moving member 14 reaches its backward moving limit position simultaneously as the disk 5 is clamped, the vicinity of the rear end portion of said moving member 14 comes into engagement with the detecting switch 108, as shown in FIGS. 22 and 24, to operate the detecting switch 108 to thereby stop the motor 20. In this state, the disk can be played.

Figure 33:
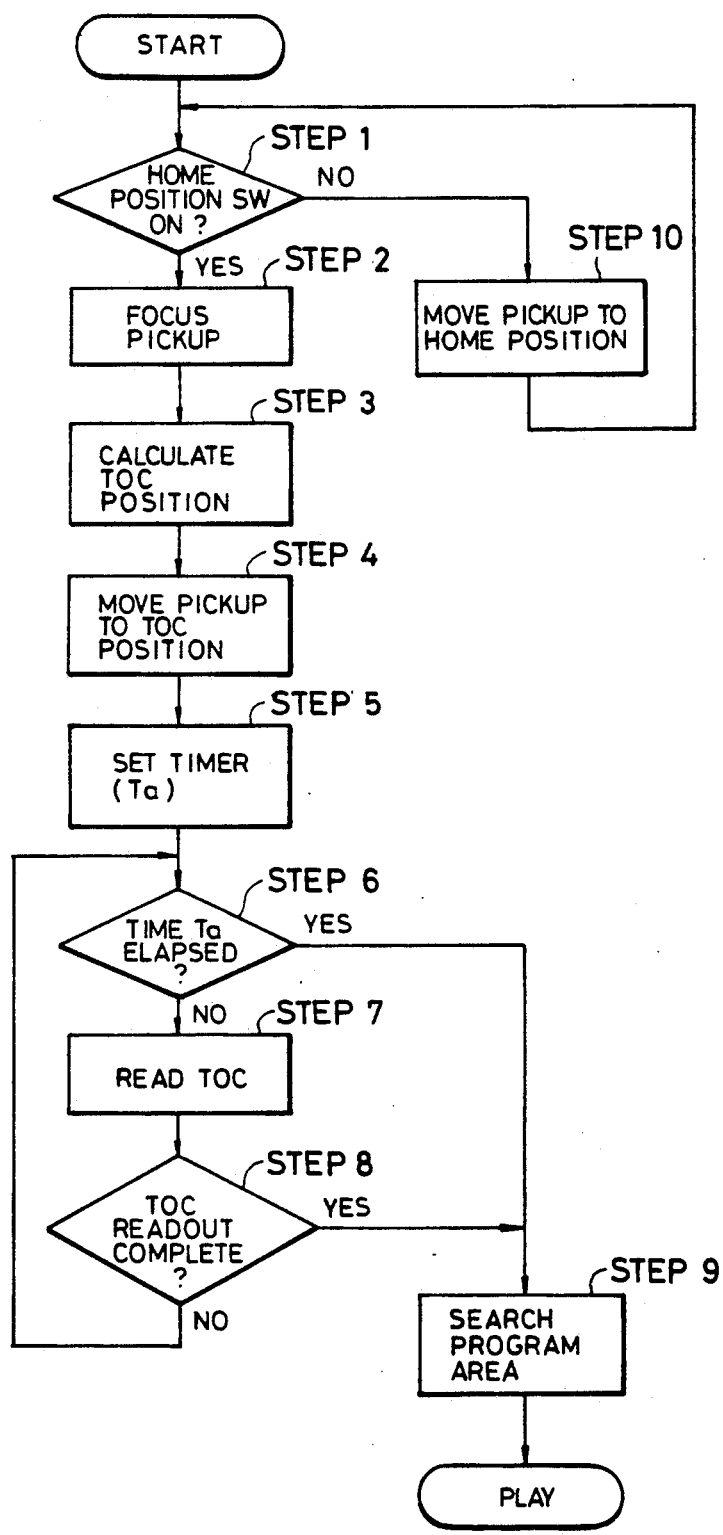
FIGS. 33 to 37 are flow charts for explaining the operations of the control system shown in FIG. 29.

Upon commencement of playing, as shown in FIG. 33, it is firstly judged at step 1 on the basis of the output of the detecting switch 110 whether or not the pickup 117 (as shown in FIG. 29) is in its home position If YES, the pickup 117 is focused (at step 2) to start its reading operation. At step 3, moreover, an information recording start position or the read-in area of the disk 5, i.e., the TOC (which is the abbreviation of "Table of Contents") position is calculated on the basis of address information obtained by the pickup 117. The TOC is recorded with pieces of formatting information such as the number or total absolute time of pieces of music stored in the disk or the play time of each piece of music. It is preferable to read out the recorded information of the TOC at the start of the play. For the method for calculating the TOC position (or a target address) from the present address, an exemplary method has been proposed in Japanese Patent Application No. 58-202994 by one of the present applicants. This method repeatedly calculates the distance to a target address to move the pickup 117 until the distance to the target address comes to a constant value, by making use of the fact that the distance to the target address can be more accurately obtained as the target address is more closely approached.

If the TOC position is calculated at step 3, the pickup 117 is moved (at step 4) to the TOC position, and a timer built in to the control circuit 111 and having a constant time $T_a$ (e.g., 15 seconds) is subsequently set (at step 5). At step 6, it is judged whether or not the aforementioned constant time $T_a$ has elapsed. If NO, the contents of the TOC are read out (at step 7). Subsequently, it is judged (at step 8) whether or not the read-out of the TOC contents has been completed. If YES, the program area is searched (at step 9), and the operation is advanced to the playing operation.

In case it is judged at step 8 that the read-out of the TOC contents has not yet been completed, the aforementioned operations are repeated by returning to step 6. In case it is judged at step 6 in those repeated operations that the aforementioned constant time $T_a$ has elapsed, the operation skips to step 9 to come into the playing operation by assuming that there is an error in the read-in area, for example, to cause the "hang-up". As a result, the operation can be prevented from causing the hang-up to enter an endless loop by the error in the read-in area. Even if the TOC contents are not wholly searched, the sequence ends with lapse of the constant time $T_a$ so that the system can be smoothly operated. In the digital audio disk player, incidentally, each program information can be searched even if the TOC contents can not be read out.

In case it is judged in step 1 that the pickup 117 is not in its home position, the pickup 117 is brought (at step 10) to the home position by the carriage mechanism 13.

The digital audio disk is recorded with a plurality of separate pieces of program information (such as music passages) so that the player is given a memory play function to store the addresses of arbitrary pieces of music in the memory while allocating it in advance to thereby play the addressed pieces of music sequentially in the order their addresses are stored in that memory.

Figure 34:
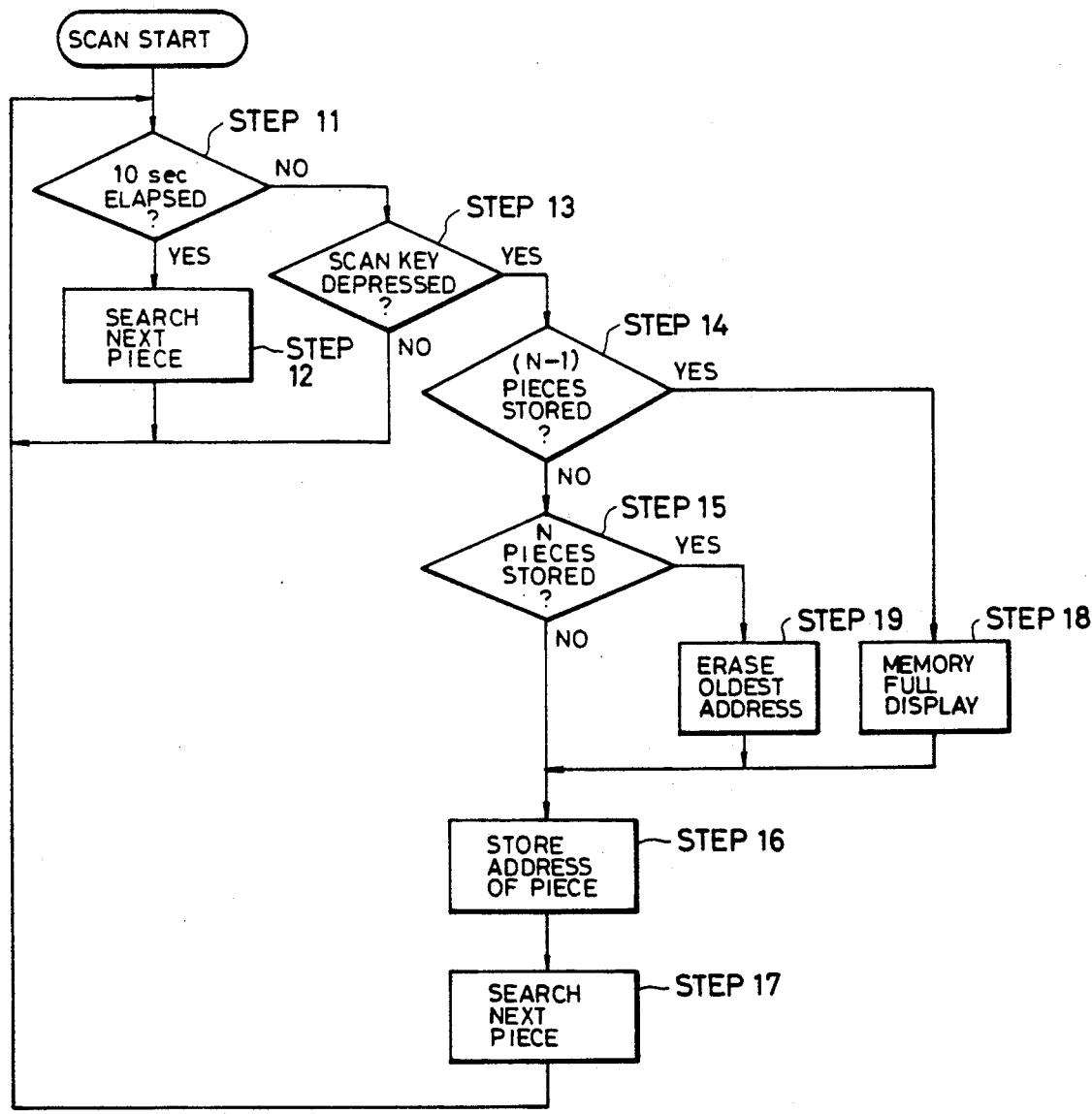

The procedure for storing those allocated pieces of music in the memory will be described in accordance with the flow chart of FIG. 34. A scan mode is initiated by momentarily depressing (or turning on) a scan key (which is one of the grouped control buttons 6 of FIG. 29, although not shown by itself). In this scan mode, the head or beginning of each piece of music is played for a constant time (e.g., 10 seconds). If the lapse of 10 seconds is determined at step 11, a next piece of music is searched (at step 12). These operations are conducted for all the pieces of music recorded.

In case, in this scan mode, it is judged at step 11 that the time of 10 seconds has not yet elapsed and at step 13 that the scan key has once again been depressed (or turned on), the operation is advanced to step 14 so as to store the address of that piece of music in the memory. Otherwise, the operation is returned again to step 11.

If the number of pieces of music that can be stored in the memory is denoted as N, it is judged at step 14 whether or not the memory has stored a number (N−1) of addresses for pieces of music. If NO, it is subsequently judged at step 15 whether or not the memory has stored an number N (i.e., the storable number) of pieces of music. If NO at step 15, the address information (e.g., a track number) of that music is stored (at step 16) in the memory, and a next piece of music is then searched (at step 17), until the operation is returned to step 11.

In case it is judged at step 14 that the number of addresses of the pieces of music stored in the memory has reached the value (N−1), it is displayed (at step 18) on the display 116 that the number of pieces of music to be stored in the memory is going to reach its limit value, and the operation is then returned to step 16 so that the address information of that musical piece is stored in the memory. In case it is judged at step 15 that the number of addresses for musical pieces stored in the memory has reached the value N, on the other hand, the address information of the oldest piece of music is erased (at step 19), and the operation is then returned to step 16 so that the address information of the latest piece of music is stored in the memory.

In these ways, the allocated information on the music is stored in the memory. According to this method, the contents of the pieces of music to be stored in the memory can be confirmed, and the scan key can also be used for storing an address for a piece of music in the memory.

Incidentally, this method should not be limited to the application to the digital audio disk but can be applied to a digital audio tape or further to a conventional audio tape if the count value between two pieces of music is used as the address information or if that tape has stored thereon the address information.

Figure 35:
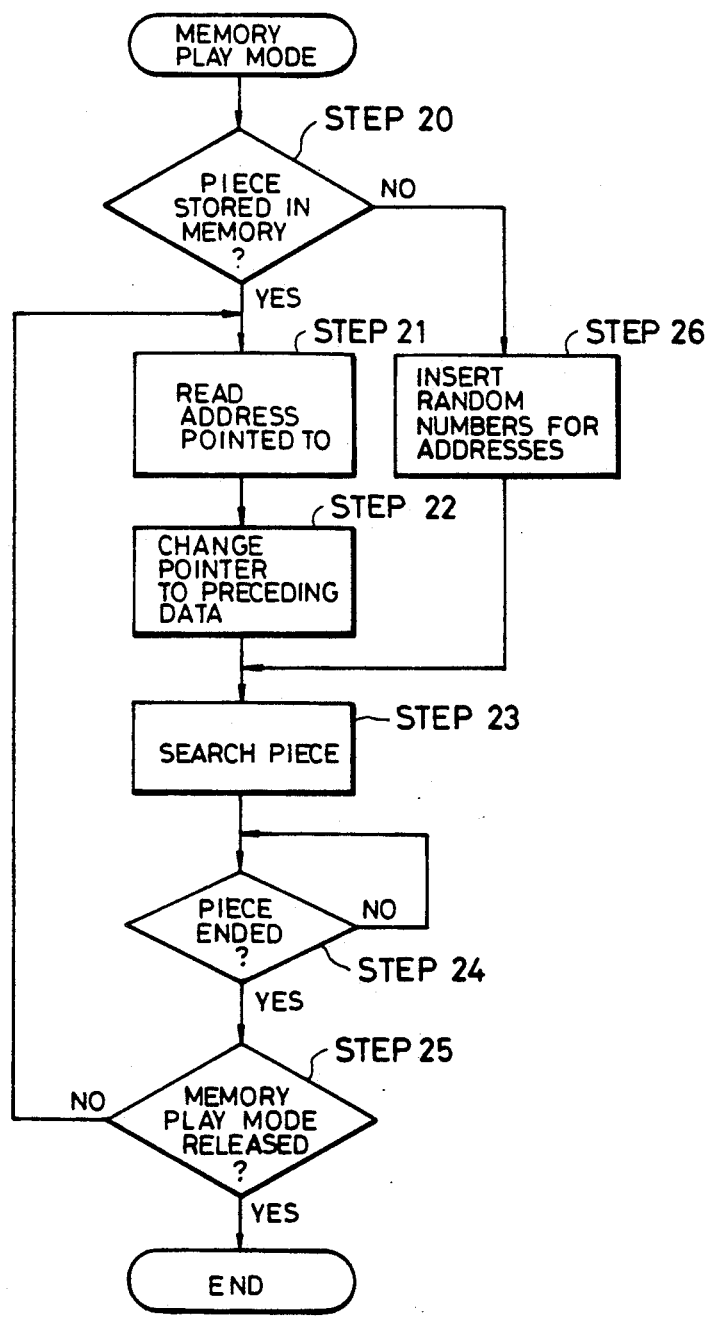

Next, the operations in a memory play mode for sequentially playing the pieces of music whose addresses stored in the memory will be described in the following in accordance with the flow chart of FIG. 35.

When in the memory play mode, it is first judged at step 20 whether or not an allocated piece of music is stored in the memory. That is, whether the memory contains addresses of pieces of music that have effectively been allocated. If YES, the data (e.g., the address information) which is pointed to at present by a pointer for selecting one of the plural allocated pieces of music in the memory is read (at step 21). Then, the pointer is advanced (at step 22) to the one immediately preceding data, and the allocated music having the read address is then searched (at step 23) and thus played Subsequently, if it is judged at step 24 that the play of the allocated music has been ended and (at step 25) that the memory play mode is not yet released at that time, the operation is returned to step 21 at which time the next allocated music pointed to by the pointer is played.

These operations are subsequently repeated until it is judged at step 25 that the memory play mode is released.

In case it is judged at step 20 that there is no allocated music having addresses stored in the memory, the operation is advanced to step 26. At this step 26, allocated pieces of music are randomly allocated by having a random number stored in the memory as an address up to the capacity of the memory. Then, the first allocated music having an address stored in the memory is searched (at step 23), and operation returns to step 21. Steps 24 and 25 are subsequently repeated until it is judged at step 25 that the memory play mode has been released Thus, by producing the addresses for the newly allocated pieces of music by a random number and by playing them in the order of allocation in case no allocated music has its address stored in the memory, it is unnecessary to display whether or not the memory is stored with addresses of allocated music, and the play can be made in any case if the memory play mode is selected. As a result, the usability can be improved.

If the memory play mode is once released but restored, the operations from step 20 are repeated, as described above. Since, by this time, the pointer in the memory has advanced to the data next to that called previously, the play is started from the allocated music next to that played previously. As a result, even if the selection and release of the memory play mode are repeated, the music to be called is sequentially changed so that identical allocated music is not called each time of selection of the memory play mode.

The use of this system should not limited to the digital audio disk but can be applied to the digital audio tape and so on.

Figure 36:
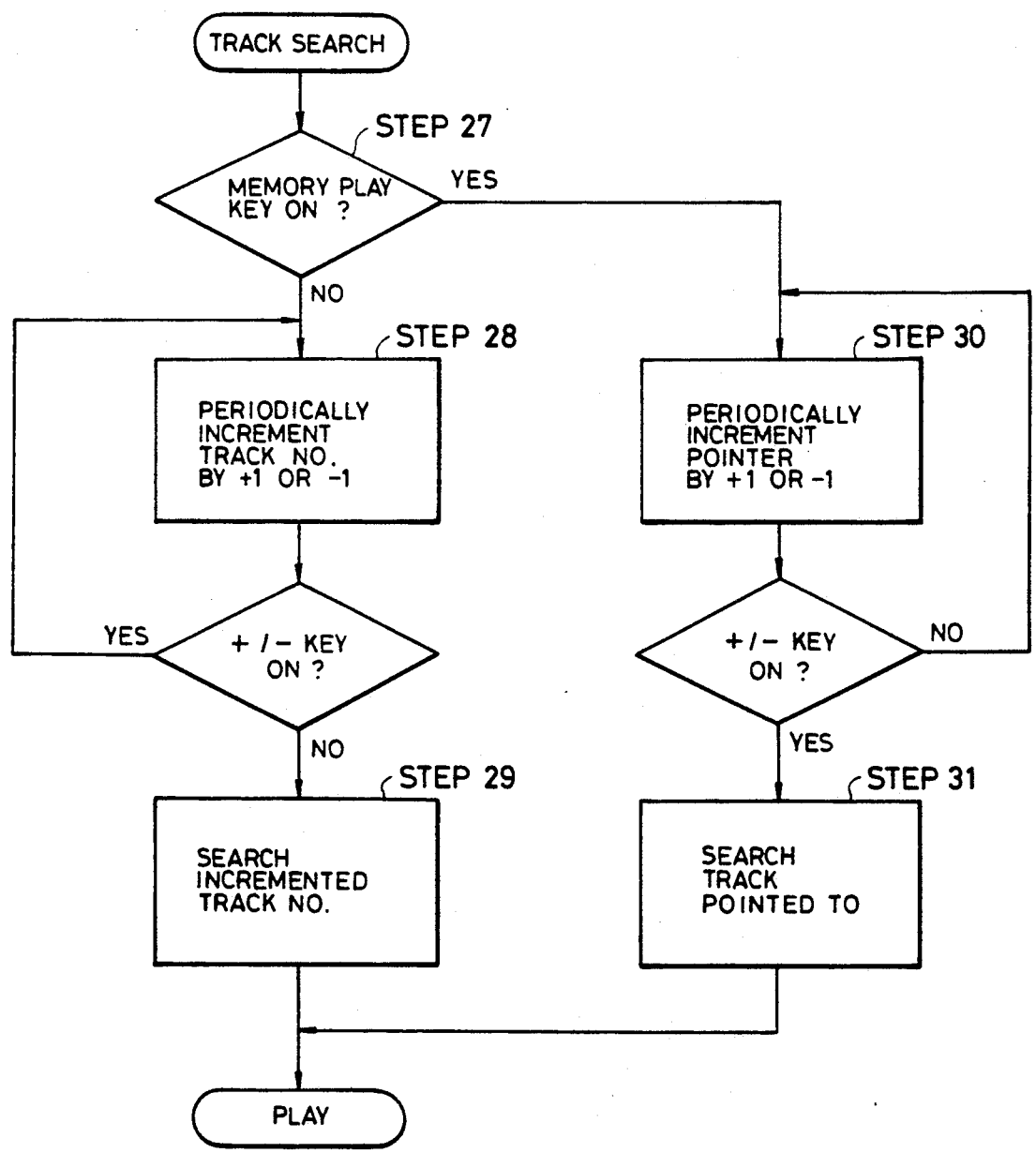

Although the description thus far made is directed to the case in which the allocated pieces of music having addresses stored in the memory are played, the track search for searching the music of a track number (which is abbreviated into "TNO") by changing the track number or the address information of the music up or down by operating a track (±) key will be described in the following with reference to the flow chart of FIG. 36. The track (±) key has two active positions for incrementing in the positive and negative directions as well as an inactive position indicating no incrementing. When the track search is entered by turning on the track (±) key, it is first judged (at step 27) whether or not the aforementioned memory play mode is selected. If NO, the allocated track number is sequentially incremented by +1 or decremented by −1 with a constant period. As long the track (±) key is turned on, and the incremented track number is displayed (at step 28) in the display 116. When the track (±) key is turned off after a number of increments, the search is directed (at step 29) to the allocated track number displayed finally in the display 116 so that the playing operation is entered.

In case it is judged at step 27 that the memory play mode is selected, the aforementioned pointer in the memory is sequentially incremented by +1 or decremented by −1 (at step 30). When the track (±) key is finally turned off, the search is directed (at step 31) to the track number finally pointed to by the pointer. As a result, the playing operation of that allocated music is entered.

Thus, the added function having the memory play mode and the track search is such a novel one as does not in the least exist in the prior art. This novel function makes it possible to promptly select and play the desired one of the allocated pieces of music stored in the memory and can be effectively applied especially to an auto changer for suitably selecting and automatically reproducing a plurality of disks.

Next will be described high-speed reproducing operations, in which the jumping operation and the reproduction operation are alternately repeated. Examples of two such operations are the fast forward (i.e., FF) operation and the review (i.e., REV) operation. In the jumping operation, the information detecting point (or the spot beam) of the pickup 117 jumps a constant number of recording tracks of the disk 5. The description will be referenced to the flow chart of FIG. 37. Incidentally, the address information of a plurality of pieces of music recorded in the disk is exemplified by not only the track number set to correspond to each musical piece but additionally an index (i.e., IX) corresponding to each musical section in case the music piece is further subdivided, such as movements in the case of music. These pieces of address information are recorded in the Q channel of the sub-code in the so-called "CD format" so that they can be detected from the read-out information of the pickup 117.

Figure 37:
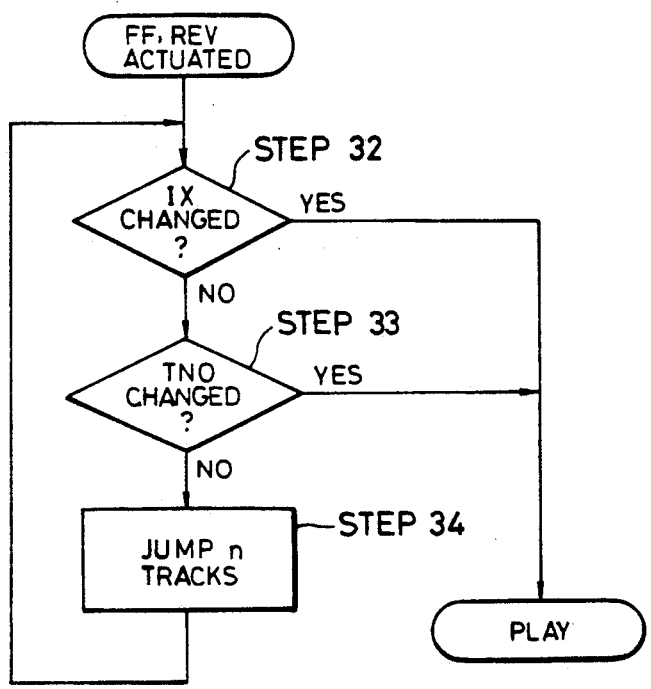

As shown in FIG. 37, it is first judged (at step 32) whether or not the aforementioned index (IX) has changed on the basis of the read-out information of the pickup 117. If NO, it is subsequently judged (at step 33) whether or not the track number TNO has changed. If NO, a constant number n of tracks are jumped (at step 34) so that the operation is returned to step 32. In case it is judged at this step 32 that the index IX has changed, the operation proceeds to the playing mode. In case it is judged at step 33 that the track number has changed, there also operation is likewise advanced to the playing mode.

Thus, in the high-speed reproducing operation, by automatically interrupting this operation at the instant when the index or track number changes and by changing the same operation to a normal reproducing operation, the desired position to be reproduced is not passed over contrary to the desire of the user unless the FF and REV keys are of the non-lock type. This provides effective safety especially in the case of a disk player to be mounted on an automobile.

In the special reproducing mode described above, the desired pieces of music are played in an arbitrary order. It is needless to say that the disk is played from its first music in the normal reproducing mode.

When the playing operation is ended so that the carriage 48 reaches its moving limit position, the carriage 48 and the turntable 45 are stopped. Simultaneously with this, the motor 20 starts to be reversed. As a result, the tray 10, the moving members 13 and 14, the container 22, the moving plates 67 and 68, the guide member 74, the clamp mechanism and so on are returned to their positions before the play in operations just the reverse of those for the aforementioned disk loading operations. Moreover, the carriage 48 is also returned to its home position.

Thus, the disk 5 can be recovered.

Figure 38:
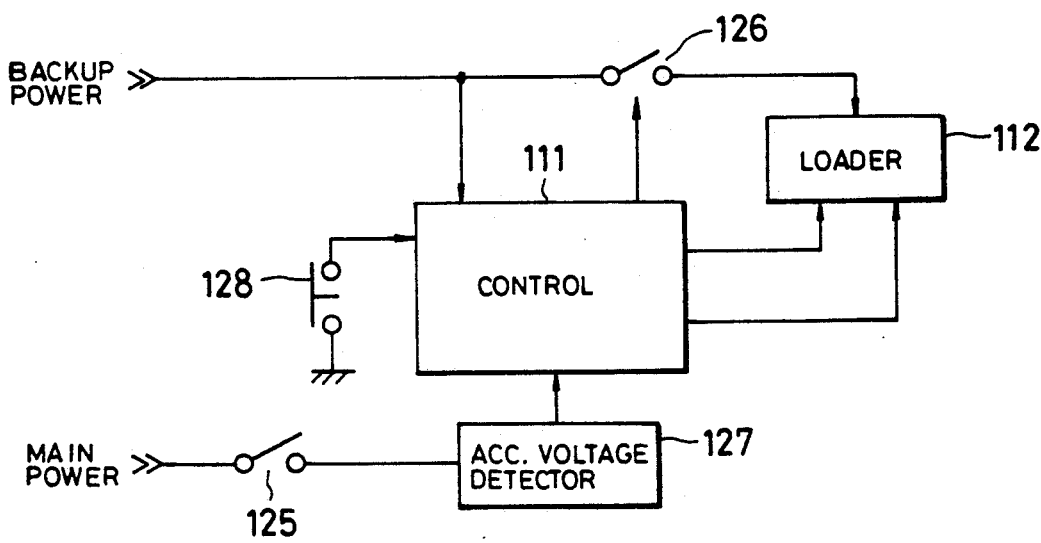
FIG. 38 is a block diagram showing the construction of the control system in a case where the present disk player is used with an automobile application environment.

Incidentally, in case the present disk player is to be used with an automobile, as shown in FIG. 38, the control circuit 111 is powered by a backup power supply, and the respective mechanical units are constructed such that they are actuated by the main power which is supplied by turning on (or closing) the so-called accessory switch 125 of the automobile. Of those various mechanical units, however, only the loading mechanism 112 is powered by the backup power supply through an auxiliary switch 126 so that the disk loaded into the player may be ejected even in case the main power is turned off. The auxiliary switch 126 is turned on or off by the control circuit 111.

Figure 39:
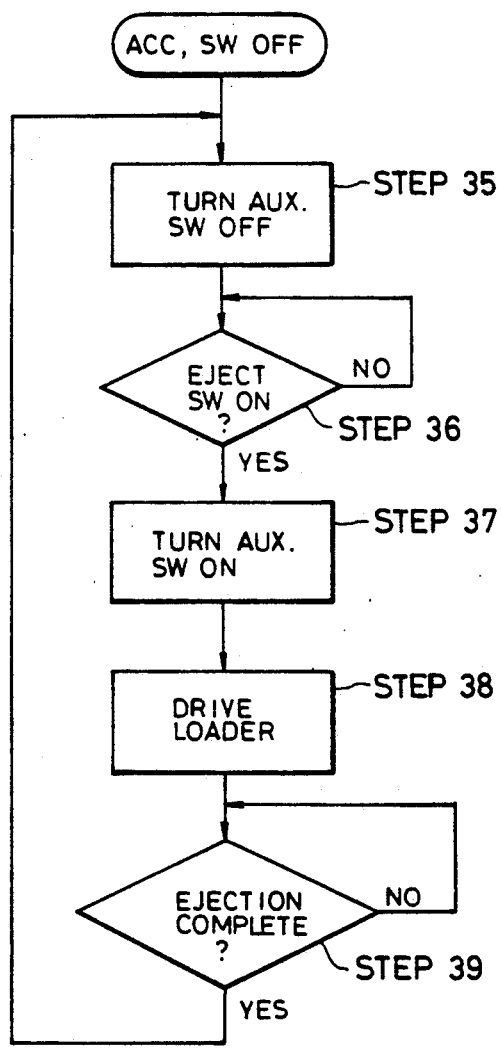
FIG. 39 is a flow chart for explaining the operations of the circuit of FIG. 38.

The controls of the auxiliary switch 126 by the control circuit 111 will be described on the basis of the flow chart of FIG. 39. When the accessory switch 125 is turned off, the OFF state of the main power supply is detected in terms of the detected output of an Acc voltage detecting circuit 127, and the auxiliary switch 126 is turned off (or opened) (at step 35). If, in this state, it is detected at step 36 that an eject switch 128 is turned on, the auxiliary switch 126 is turned on (or closed) (at step 37), and the backup power is supplied to the loading mechanism 112 (at step 38) to drive the loading mechanism 112. If the completion of the disk ejection is detected (at step 39), moreover, the operation is returned to step 35 so that the auxiliary switch 126 is turned off.

According to this construction, the disk incorporated into the player can be ejected even when the accessory switch 125 is off, and the backup power need not be supplied at all times to the loading mechanism 112 when the accessory switch 125 is off, thus effecting power economy.

As has been described hereinbefore, according to the recorded information reproducing method of the present invention, the order of the address information to be called from the memory is stored in the memory play mode so that, in case the memory play mode is released and selected again, reproduction is started from the program information which corresponds to the address information next to that last called in the preceding memory play mode. As a result, the program information to be reproduced at first is sequentially changed even if the selection and release of the memory play mode are repeated, so that no identical information is called each time the memory play mode is selected.

What is claimed is:

1. A carriage servo unit in a disk player, comprising:
   a pick-up for reading information recorded on a disk;
   a carriage movable in a radial direction of said disk and carrying said pick-up;
   a motor for driving said carriage;
   switching means for selectively applying a variable carriage drive voltage to said motor; and
   control means for controlling said switching means to apply said drive voltage to said motor only when an absolute value of said drive voltage exceeds a predetermined voltage.

2. A carriage servo unit as recited in claim 1, further comprising short-circuit means for selectively short circuiting said motor and wherein said control means controls said short-circuit means to short circuit said motor when said absolute value of said drive voltage is less than said predetermined voltage.

3. A carriage servo unit as recited in claim 1, wherein said motor is a bidirectional motor and said drive voltage is a bipolar voltage.

4. A carriage servo unit as recited in claim 2, wherein said motor is a bidirectional motor and said drive voltage is a bipolar voltage.

5. A method of reproducing recorded program information, comprising the steps of:
   storing plural pieces of program information on a recording medium;
   storing pieces of address information, that relate to the locations of said pieces of program information on said recording medium, in an order in a memory;
   retrieving a respective one of pieces of address information being referenced by a pointer in said memory;
   reproducing a program using stored program information associated with said respective one of said pieces of address information from said retrieving step;
   after said retrieving step and prior to completion of reproducing said program in said reproducing step, changing said pointer to reference a next respective one of said pieces of address information in said order; and
   repeating and retrieving, reproducing and changing steps such that programs associated with at least a portion of said pieces of address information in said order are reproduced.

6. A method as recited in claim 5 wherein said repeating step is continued until there is a request made for an interruption of said repeating step.

7. A method as recited in claim 6, further comprising:
   determining is said memory contains said address informations; and
   if said memory does not contain said address informations, storing random numbers as said address informations in said memory.

8. A method as recited in claim 5, wherein, after said storing steps, said retrieving, changing and reproducing steps are sequentially produced with said retrieving step being produced as a first step, said changing step being produced as a second step, and said reproducing step being produced as a third step.

9. A method of reading content information from a read-in area of a disk, said method comprising the steps of:
   setting a timer with a predetermined time, an elapse of said predetermined time being an indication that a read-in operation is in an erroneous hung-up condition;
   reading a read-in area of a disk, said read-in area containing formatting information about a plurality of program informations recorded on said disk; and
   if said reading step is not completed by the elapse of said predetermined time, switching to a reproduction mode for sequentially reproducing said plurality of program informations.

10. A reproduction method for controlling a manual information searching operation in a program reproduction mode, said method, comprising the steps of:
    manually depressing manual switch means to initiate a manual information searching operation, and in response thereto jumping over a number of tracks to a new track corresponding to an address location of a next program information of a program stored in memory;
    then reading from said disk beginning at said new track address information on contents of said new track;
    determining if said address information at said new track differs from previous address information;
    if said determining step determines said address information does not differ, then returning to said jumping step; and
    if said determining step determines that said address information does differ, then reproducing said contents of said new track.

11. A reproduction method as recited in claim 10, wherein said address information including major divisions of contents of said disk and sub-divisions of said major-divisions.

* * * * *